United States Patent
Whikehart

(10) Patent No.: US 12,461,497 B2
(45) Date of Patent: Nov. 4, 2025

(54) SYSTEMS AND METHODS OF ALTERNATIVE ENERGY INTEGRATION WITH HYDROCARBON PRODUCTS

(71) Applicant: MARATHON PETROLEUM COMPANY LP, Findlay, OH (US)

(72) Inventor: David Whikehart, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 986 days.

(21) Appl. No.: 17/456,246

(22) Filed: Nov. 23, 2021

(65) Prior Publication Data

US 2022/0083017 A1  Mar. 17, 2022

Related U.S. Application Data

(63) Continuation-in-part of application No. 17/392,588, filed on Aug. 3, 2021, now Pat. No. 11,550,273, and
(Continued)

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC ................ G05B 19/042; G05B 13/042; G05B 19/4189; G05B 2219/45076; G05B 2219/2639; C10G 2300/1011; C10G 2300/4043; C10G 47/36; C10G 9/00; C10L 1/02; C10L 1/04; C10L 2200/0469;
(Continued)

(56) References Cited

U.S. PATENT DOCUMENTS

| 5,193,594 A | 3/1993 | Johansson |
| 5,271,526 A | 12/1993 | Williams |

(Continued)

FOREIGN PATENT DOCUMENTS

| AU | 2020101782 | 9/2020 |
| CN | 110029645 | 7/2019 |

(Continued)

OTHER PUBLICATIONS

"Blockchain Database for Sustainable Biofuels: A Case Study", Roundtable on Sustainable Biomaterials (RSB) and Bioledger, Mar. 2021.

(Continued)

*Primary Examiner* — Ellen M Mcavoy
*Assistant Examiner* — Chantel Graham
(74) *Attorney, Agent, or Firm* — Ray Quinney & Nebeker P.C.; Paul N. Taylor

(57) ABSTRACT

Systems and methods to efficiently integrate alternative energy with a hydrocarbon production process to produce a hydrocarbon product for distribution. The hydrocarbon product for distribution is produced through one or more selections of available agricultural fuels, available renewable power, and available petroleum product production options. Such selections are determined based on time and efficiency to produce a low carbon intensity hydrocarbon product.

10 Claims, 17 Drawing Sheets

Related U.S. Application Data a continuation-in-part of application No. 17/392,600, filed on Aug. 3, 2021, now Pat. No. 11,899,416, and a continuation-in-part of application No. 17/392,567, filed on Aug. 3, 2021, now Pat. No. 11,270,393, and a continuation-in-part of application No. 17/392,622, filed on Aug. 3, 2021, now Pat. No. 11,921,476.

(60) Provisional application No. 63/199,001, filed on Nov. 30, 2020, provisional application No. 63/113,186, filed on Nov. 12, 2020, provisional application No. 63/198,626, filed on Oct. 30, 2020, provisional application No. 63/066,912, filed on Aug. 18, 2020, provisional application No. 63/061,162, filed on Aug. 4, 2020.

(58) Field of Classification Search
CPC ......... C10L 2200/0476; C10L 2230/14; C10L 2270/10; C10L 2290/24; C10L 2290/58; C10L 3/06; C12M 21/12; C12M 41/48; C12P 7/06; C12P 7/649; E21B 41/0064; E21B 43/12; E21B 43/25; G01N 33/225; G01N 33/28; G06Q 10/083; G06Q 30/018; G06Q 50/06; G06Q 50/40; G08C 17/02; Y02E 50/10; Y02P 20/151
See application file for complete search history.

(56) References Cited

U.S. PATENT DOCUMENTS

| | | | |
|---|---|---|---|
| 5,430,295 | A | 7/1995 | Le Febre |
| 6,966,326 | B2 | 11/2005 | Murray |
| 7,797,205 | B2 | 9/2010 | Song et al. |
| 8,354,065 | B1 | 1/2013 | Sexton et al. |
| 8,506,656 | B1 | 8/2013 | Turocy |
| 8,597,380 | B2 | 12/2013 | Buchanan |
| 9,080,111 | B1 | 7/2015 | Huff |
| 10,605,411 | B2 | 3/2020 | Robbins et al. |
| 11,132,008 | B2 | 9/2021 | Miller |
| 11,164,406 | B2 | 11/2021 | Meroux et al. |
| 11,204,271 | B2 | 12/2021 | Williams et al. |
| 11,270,393 | B2 | 3/2022 | Whikehart et al. |
| 11,320,095 | B2 | 5/2022 | Rady et al. |
| 11,334,794 | B2 | 5/2022 | Celano et al. |
| 11,378,234 | B2 | 7/2022 | Rady |
| 11,397,087 | B1 | 7/2022 | Mishra |
| 11,448,773 | B2 | 9/2022 | Bennett |
| 11,550,273 | B2 | 1/2023 | Whikehart et al. |
| 11,578,638 | B2 | 2/2023 | Thobe |
| 11,635,735 | B2 | 4/2023 | Whikehart et al. |
| 11,715,950 | B2 | 8/2023 | Miller et al. |
| 11,720,526 | B2 | 8/2023 | Miller et al. |
| 11,789,414 | B2 | 10/2023 | King et al. |
| 11,899,416 | B2 | 2/2024 | Whikehart et al. |
| 11,921,476 | B2 | 3/2024 | Whikehart |
| 11,994,259 | B2 | 5/2024 | Freeman et al. |
| 12,092,270 | B2 | 9/2024 | Freeman et al. |
| 12,092,998 | B2 | 9/2024 | Whikehart et al. |
| 12,092,999 | B2 | 9/2024 | Whikehart et al. |
| 2005/0022446 | A1 | 2/2005 | Brundage |
| 2005/0058016 | A1 | 3/2005 | Smith |
| 2009/0305360 | A1 | 12/2009 | Breneman et al. |
| 2009/0322544 | A1 | 12/2009 | McDowell |
| 2010/0332273 | A1 | 12/2010 | Balasubramanian et al. |
| 2011/0093127 | A1* | 4/2011 | Kaplan .............. G06Q 10/06 700/297 |
| 2012/0271677 | A1 | 10/2012 | Rhodes, III |
| 2014/0218242 | A1 | 8/2014 | Platzer |
| 2014/0222698 | A1 | 8/2014 | Potdar et al. |
| 2014/0324727 | A1 | 10/2014 | Hoda |
| 2017/0160118 | A1* | 6/2017 | Williams .............. H04L 67/12 |
| 2018/0068359 | A1 | 3/2018 | Preston et al. |
| 2020/0291316 | A1 | 9/2020 | Robbins et al. |
| 2020/0372375 | A1 | 11/2020 | Pathak et al. |
| 2021/0133670 | A1 | 5/2021 | Cella |
| 2021/0156521 | A1 | 5/2021 | Laschinger et al. |
| 2021/0192388 | A1 | 6/2021 | Cunningham |
| 2021/0254793 | A1 | 8/2021 | Rady |
| 2022/0041974 | A1 | 2/2022 | Whikehart et al. |
| 2022/0042406 | A1 | 2/2022 | Whikehart et al. |
| 2022/0044336 | A1 | 2/2022 | Whikehart et al. |
| 2022/0267810 | A1 | 8/2022 | Lyubovsky et al. |
| 2022/0343229 | A1 | 10/2022 | Gruber et al. |
| 2022/0398448 | A1 | 12/2022 | Jayaraman et al. |
| 2023/0015077 | A1 | 1/2023 | Kim |
| 2023/0078852 | A1 | 3/2023 | Campbell et al. |
| 2023/0082127 | A1 | 3/2023 | Whikehart et al. |
| 2023/0205148 | A1 | 6/2023 | King et al. |
| 2023/0259080 | A1 | 8/2023 | Whikehart et al. |
| 2023/0259088 | A1 | 8/2023 | Borup et al. |
| 2023/0408990 | A1 | 12/2023 | King et al. |
| 2024/0045403 | A1 | 2/2024 | Wilbek et al. |
| 2024/0126223 | A1 | 4/2024 | Whikehart |
| 2024/0133524 | A1 | 4/2024 | Freeman |
| 2024/0160162 | A1 | 5/2024 | Whikehart |
| 2024/0230035 | A9 | 7/2024 | Freeman |
| 2024/0263749 | A1 | 8/2024 | Freeman |
| 2024/0319688 | A1 | 9/2024 | Whikehart |
| 2024/0319689 | A1 | 9/2024 | Whikehart |
| 2024/0353072 | A1 | 10/2024 | Freeman |

FOREIGN PATENT DOCUMENTS

| | | |
|---|---|---|
| CN | 111062568 | 4/2020 |
| EP | 3739295 | 11/2020 |
| IN | 12812008 | 8/2010 |
| WO | 2006083273 | 8/2006 |
| WO | 2021100004 | 5/2021 |
| WO | 2021152205 | 8/2021 |
| WO | 2022149501 | 7/2022 |
| WO | 2022157589 | 7/2022 |
| WO | 2023038579 | 3/2023 |
| WO | 2023137304 | 7/2023 |
| WO | 2023164683 | 8/2023 |

OTHER PUBLICATIONS

Lloyd's Register, Using technology to trace the carbon intensity of sustainable marine fuels, Feb. 15, 2023.

Elgowainy, Amgad et al., Energy Efficiency and Greenhouse Gas Emission Intensity of Petroleum Products at U.S. Refineries, Environ. Sci. Technol. 2014, 48, 7612-7624.

Argonne National Laboratory, General Motors Corporation, Well-to-Wheel Energy Use and Greenhouse Gas Emissions of Advanced Fuel/Vehicle Systems, North American Analysis, vol. 1, Apr. 2001.

Gordon, Deborah, et al., Know Your Oil, Creating a Global Oil-Climate Index, 2015 Carnegie Endowment for International Peace.

BP, BP sets ambition for net zero by 2050, fundamentally changing organisation to deliver, Feb. 12, 2020.

BP, from IOC to IEC, Second quarter 2020 financial results and strategy presentation, Aug. 2020.

BP p.l.c. Group results, Second quarter and half year 2020, London, Aug. 4, 2020.

Brinkman et al., Well-to-Wheels Analysis of Advanced Fuel/Vehicle Systems—A North American Study of Energy Use, Greenhouse Gas Emissions, and Criteria Pollutant Emissions, May 2005.

El-Houjeiri, Hassan M. et al., Oil Production Greenhouse Gas Emissions Estimator, Jun. 5, 2017.

Argonne National Laboratory, Cradle-to-Grave Lifecycle Analysis of U.S. Light-Duty Vehicle-Fuel Pathways: A Greenhouse Gas Emissions and Economic Assessment of Current (2015) and Future (2025-2030) Technologies, ANL/ESD-16/7, Rev. 1, Sep. 2016.

Forman, Grant S. et al., U.S. Refinery Efficiency: Impacts Analysis and Implications for Fuel Carbon Policy Implementation, Environmental Science & Technology, 2014.

Malins, Chris et al., Crude Oil Greenhouse Gas Emissions Calculation Methodology for the Fuel Quality Directive, The Interna-

(56) References Cited

OTHER PUBLICATIONS tional Council on Clean Transportation to the European Commission Directorate-General for Climate Action, 2014.

Nimana, Balwinder et al., Life cycle assessment of greenhouse gas emissions from Canada's oil sands-derived transportation fuels, Department of Mechanical Engineering, University of Alberta, 2015.

Ramachandran, Srikkanth et al., Well to wheel analysis of low carbon alternatives for road traffic, Energy Environ. Sci. 2015, 8, 3313.

Toyota Motor Corporation, Well-to-Wheel Analysis of Greenhouse Gas Emissions of Automotive Fuels in the Japanese Context, Nov. 2004.

Vineyard, Donald, et al., A Comparison of Major Petroleum Life Cycle Models, Clean Technol Environ Policy. Apr. 2017; 19(3): 735-747. doi:10.1007/s10098-016-1260-6.

Riverol, C et al., A Non-linear Autoregressive Eternal Inputs (NARX) model for estimating the mixing volumes between batches in TRANSMIX, International Journal of Heat and Mass Transfer 127, 2018, 161-163.

Cheng, Lifei et al., Logistics for world-wide crude oil transportation using discrete event simulation and optimal control, Computers and Chemical Engineering 28, 2004, 897-911.

Bush, Amy et al., Iterative Optimization and Simulation of Barge Traffice on an Inland Waterway, Proceedings of the 2003 Winter Simulation Conference, Jan. 2004, 1751-1756.

Smith, Laurence Douglas et al., Simulation of alternative approaches to relieving congestion at locks in a river transport system, The Journal of the Operational Research Society , vol. 60, No. 4, Apr. 2009, 519-533.

Martins, Marcella Scoczynski Ribeiro et al., Discrete Event Simulation for Petroleum Transfers Involving Harbors, Refineries and Pipelines, Rio Pipeline 2009 Conference & Exposition, Sep. 2009.

\* cited by examiner

SYSTEMS AND METHODS OF ALTERNATIVE ENERGY INTEGRATION WITH HYDROCARBON PRODUCTS

CROSS REFERENCE TO RELATED APPLICATIONS

This application claims priority to, and the benefit of, U.S. Provisional Application No. 63/199,001, filed Nov. 30, 2020, titled "SYSTEMS AND METHODS OF ALTERNATIVE ENERGY INTEGRATION WITH HYDROCARBON PRODUCTS," the disclosure of which is incorporated herein by reference in its entirety. This application is also a continuation-in-part of U.S. Non-Provisional application Ser. No. 17/392,600, filed Aug. 3, 2021, titled "SYSTEMS AND METHODS FOR HOLISTIC LOW CARBON INTENSITY FUEL PRODUCTION," which claims priority to U.S. Provisional Application No. 63/061,162, filed Aug. 4, 2020, titled "SYSTEMS AND METHODS FOR HOLISTIC LOW CARBON INTENSITY FUEL PRODUCTION," U.S. Provisional Application No. 63/066,912, filed Aug. 18, 2020, titled "SYSTEMS AND METHODS FOR HOLISTIC LOW CARBON INTENSITY FUEL PRODUCTION," U.S. Provisional Application No. 63/198,626, filed Oct. 30, 2020, titled "SYSTEMS AND METHODS FOR HOLISTIC LOW CARBON INTENSITY FUEL AND HYDROGEN PRODUCTION," and U.S. Provisional Application No. 63/113,186, filed Nov. 12, 2020, titled "SYSTEMS AND METHODS FOR HOLISTIC LOW CARBON INTENSITY FUEL AND HYDROGEN PRODUCTION," the disclosures of which are incorporated herein by reference in its entirety. This application is also a continuation-in-part of U.S. Non-Provisional application Ser. No. 17/392,567, filed Aug. 3, 2021, titled "SYSTEMS AND METHODS FOR HOLISTIC LOW CARBON INTENSITY FUEL PRODUCTION," which claims priority to U.S. Provisional Application No. 63/061,162, filed Aug. 4, 2020, titled "SYSTEMS AND METHODS FOR HOLISTIC LOW CARBON INTENSITY FUEL PRODUCTION," U.S. Provisional Application No. 63/066,912, filed Aug. 18, 2020, titled "SYSTEMS AND METHODS FOR HOLISTIC LOW CARBON INTENSITY FUEL PRODUCTION," U.S. Provisional Application No. 63/198,626, filed Oct. 30, 2020, titled "SYSTEMS AND METHODS FOR HOLISTIC LOW CARBON INTENSITY FUEL AND HYDROGEN PRODUCTION," and U.S. Provisional Application No. 63/113,186, filed Nov. 12, 2020, titled "SYSTEMS AND METHODS FOR HOLISTIC LOW CARBON INTENSITY FUEL AND HYDROGEN PRODUCTION," the disclosures of which are incorporated herein by reference in its entirety. This application is also a continuation-in-part of U.S. Non-Provisional application Ser. No. 17/392,622, filed Aug. 3, 2021, titled "SYSTEMS AND METHODS FOR HOLISTIC LOW CARBON INTENSITY FUEL AND ETHANOL PRODUCTION," which claims priority to U.S. Provisional Application No. 63/061,162, filed Aug. 4, 2020, titled "SYSTEMS AND METHODS FOR HOLISTIC LOW CARBON INTENSITY FUEL PRODUCTION," U.S. Provisional Application No. 63/066,912, filed Aug. 18, 2020, titled "SYSTEMS AND METHODS FOR HOLISTIC LOW CARBON INTENSITY FUEL PRODUCTION," U.S. Provisional Application No. 63/198,626, filed Oct. 30, 2020, titled "SYSTEMS AND METHODS FOR HOLISTIC LOW CARBON INTENSITY FUEL AND HYDROGEN PRODUCTION," and U.S. Provisional Application No. 63/113,186, filed Nov. 12, 2020, titled "SYSTEMS AND METHODS FOR HOLISTIC LOW CARBON INTENSITY FUEL AND HYDROGEN PRODUCTION," the disclosures of which are incorporated herein by reference in its entirety. This application is also a continuation-in-part of U.S. Non-Provisional application Ser. No. 17/392,588, filed Aug. 3, 2021, titled "SYSTEMS AND METHODS FOR HOLISTIC LOW CARBON INTENSITY FUEL PRODUCTION," which claims priority to U.S. Provisional Application No. 63/061,162, filed Aug. 4, 2020, titled "SYSTEMS AND METHODS FOR HOLISTIC LOW CARBON INTENSITY FUEL PRODUCTION," U.S. Provisional Application No. 63/066,912, filed Aug. 18, 2020, titled "SYSTEMS AND METHODS FOR HOLISTIC LOW CARBON INTENSITY FUEL PRODUCTION," U.S. Provisional Application No. 63/198,626, filed Oct. 30, 2020, titled "SYSTEMS AND METHODS FOR HOLISTIC LOW CARBON INTENSITY FUEL AND HYDROGEN PRODUCTION," and U.S. Provisional Application No. 63/113,186, filed Nov. 12, 2020, titled "SYSTEMS AND METHODS FOR HOLISTIC LOW CARBON INTENSITY FUEL AND HYDROGEN PRODUCTION," the disclosures of which are incorporated herein by reference in its entirety.

FIELD OF DISCLOSURE

Embodiments of this disclosure relate to the integration of alternative energy with hydrocarbon products, and more particularly, to systems and methods for procuring, refining/transforming, and making low carbon intensity hydrocarbon products available to end user consumers.

BACKGROUND

Certain gases, such as carbon dioxide, methane, nitrous oxide, hydrofluorocarbons, perfluorinated chemicals, sulfur hexafluoride, etc., when released to the atmosphere are purported to adversely contribute to climate change and have been labeled as greenhouse gases. To mitigate perceived climate change, much worldwide attention and focus has been placed on reducing the release of these greenhouse gases to atmosphere. Greenhouse gases, such as carbon dioxide, are directly released to atmosphere through the combustion of fossil fuels, biomass and other carbon-containing materials. However, providing services as well as the manufacturing and processing of goods contributes indirectly to the atmospheric release of carbon dioxide and other greenhouse gases. To quantify the direct and indirect release of greenhouse gases attributable to consumer and/or industrial activity, the carbon intensity or emission intensity was developed as a measure of the greenhouse gases emitted per unit of activity/production. With respect to transportation fuel and hydrogen production and use, the carbon intensity may be defined as the lifecycle greenhouse gases emitted per unit of energy. By assessing the lifecycle greenhouse gas emissions, all greenhouse gas emissions attributable to the fuel or hydrogen are accounted for during the entire lifecycle of the fuel or hydrogen from acquisition to processing to combustion. The carbon intensity for transportation fuels and hydrogen is often reported in units of grams of carbon dioxide equivalent per mega joule of energy. Because some greenhouse gases, such as methane, are considered to have a greater climatic effect than carbon dioxide, greenhouse gas emissions are reported in carbon dioxide equivalents.

Typical implementations of a low carbon intensity energy strategy may focus on the direct use by an end user or consumer of alternative, renewable sources of low carbon energy, such as power generated by wind, solar, or geothermal. For example, low carbon intensity renewable power may be generated at wind farms, solar farms, geothermal power plants/facilities, and/or hydroelectric facilities. Often, however, such farms and facilities are located at long distances from the end user or consumer. Thus, the alternative energy must be transferred from these remote locations to the end user over long distances, e.g., via high voltage transmission lines.

Inherent in such transmission is a loss of energy and an inefficient use of resources. Further, the transferred renewable power often is in a form that requires adaptation in order to be usable, which thereby increases its carbon intensity further. For example, to avoid conventional higher carbon intensity fuels in gasoline fueled vehicles, an end user or consumer may purchase an electric vehicle and install a home charging station to take advantage of renewable power. However, such choices may come at a considerable expense to the end user, who must purchase the electric vehicle and charging station. Moreover, the indirect use of higher carbon intensity fuels may also be overlooked. The construction of the electrical vehicles and their required accessories may contribute to significant carbon emissions if conducted using higher carbon intensity fuels. The production of electric vehicles may also create environmentally hazardous events and/or byproduct materials (e.g., mined nickel for use in batteries). Thus, this interplay may negate the overall environmental impact of the electric vehicle, even if energy is provided at a lower carbon intensity.

Similarly, renewable natural gas may often be produced at facilities located at long distances from the end user. Such long distances will necessitate transportation of the renewable natural gas via pipeline or truck to the end user or consumer. The use of conventional higher carbon intensity fuels or energy sources in such transportation will increase the carbon intensity of the renewable natural gas significantly.

Furthermore, a consumer that chooses the direct use of alternative, renewable energy source may continue to purchase higher carbon intensity liquid fuels from convenience stores or other retail outlets for occasions when electric vehicles are insufficient (e.g., long distance driving or lack of charging facilities). These higher carbon intensity liquid fuels originate in traditional refineries and similar facilities and are transported to such convenience stores with such transport further increasing the carbon intensity of the transportation fuel.

Accordingly, Applicants have recognized a need for systems and methods to integrate alternative energy into hydrocarbon products to provide an energy consumer with low carbon intensity hydrocarbon products through conventional pathways in which the low carbon intensity hydrocarbon products are achieved through targeted reductions and selections of different aspects of the production of the hydrocarbon products. The present disclosure is directed to embodiments of such systems and methods.

SUMMARY

The present disclosure is generally directed to systems and methods for integrating alternative energy with hydrocarbon products. Various aspects of hydrocarbon product operations may incrementally increase carbon intensity of a hydrocarbon product. Further, various types of alternative energies have not been fully exploited for reducing carbon intensity of hydrocarbon products. In some embodiments, the systems and methods may provide for the low carbon intensity hydrocarbon product to be obtained through various selections of options, intersections, or other paths of a hydrocarbon product operation. Such selections may include selections of renewable power, agricultural fuel, or petroleum product options. The resulting hydrocarbon product may have a lower carbon intensity due to the integration of the alternative energies (e.g., renewable energy and/or agricultural fuels) and petroleum product operation improvements (e.g., carbon capture/sequestration, process improvements). Further, the selections may vary over time, as their availability and operation efficiency may fluctuate over time. Selections may therefore be based on a carbon intensity average over time, among other factors.

Accordingly, an embodiment of the disclosure is directed to an alternative energy and hydrocarbon product integration and production system to efficiently integrate alternative energy with a hydrocarbon production process to produce a hydrocarbon product for distribution. The system may include an agricultural integration controller in signal communication with and to control one or more agricultural fuel production processes and options associated with the one or more agricultural fuel production processes, the agricultural fuel production processes and options to be operated at and associated with one or more agricultural fuel sites. The system may include a petroleum production integration controller in signal communication with and to control one or more petroleum product production processes and options associated with the one or more petroleum product production processes, the petroleum product production processes and options to be operated at and associated with one or more petroleum production sites. The system may include a renewable power integration controller in signal communication with and to control one or more renewable power utilities for use in the one or more agricultural fuel production processes and the one or more petroleum product production processes.

The system may include a hydrocarbon product controller in signal communication with the agricultural integration controller, the petroleum production integration controller, and renewable power integration controller. The hydrocarbon product controller may include one or more processors and memory storing instructions. The instructions, when executed by the one or more processors, may, for a hydrocarbon product operation occurring at a first time interval, determine, via the agricultural integration controller, one or more agricultural fuels and a carbon intensity and efficiency associated with each of the one or more agricultural fuels, and an availability of the one or more agricultural fuels based on whether the one or more agricultural fuels are available during the first time interval. The instructions may include instructions to determine, via the renewable power integration controller, one or more renewable power utilities and a carbon intensity and efficiency associated with each of the one or more available renewable power utilities, and an availability of the one or more renewable power utilities based on whether the one or more renewable power utilities are available during the first time interval. The instructions may include instructions to determine, via the petroleum product integration controller, one or more petroleum product production options and a carbon intensity and efficiency associated with each of the one or more available petroleum product production options, and an availability of the one or more petroleum product production options based on whether the one or more petroleum product production options are available during the first time interval. The instructions may include instructions to select two or more of the one or more agricultural fuels, one or more renewable power utilities, and one or more petroleum product production options, based on one or more of a total carbon intensity of the selections, total efficiency associated with each of the selections, or availability of each selection during the first time interval. The instructions may include instructions to, in response to a selection of one or more agricultural fuels and one or more renewable power utilities, initiate the hydrocarbon product operation at a corresponding agricultural fuel site with corresponding agricultural feedstock, the operation to utilize the selected one or more renewable power utilities, the agricultural fuel site to thereby convert, while utilizing the one or more renewable power utilities, the corresponding agricultural feedstock to a low carbon intensity hydrocarbon product. The instructions may include instructions to, in response to a selection of one or more petroleum product production options and one or more renewable power utilities, initiate the hydrocarbon product operation at a corresponding petroleum product site with corresponding feedstock, the operation to utilize the selected one or more renewable power utilities, the corresponding petroleum product site to thereby convert, while utilizing the one or more renewable power utilities, the corresponding feedstock to a low carbon intensity hydrocarbon product. The instructions may include instructions to, in response to a selection of one or more petroleum product production options and one or more agricultural fuels, initiate the hydrocarbon product operation at a corresponding blending site with the one or more petroleum products and the one or more agricultural fuels, the corresponding blending site to combine the one or more petroleum products and the one or more agricultural fuels thereby forming a low carbon intensity hydrocarbon product. The instructions may include instructions to, in response to a selection of one or more petroleum product production options, one or more agricultural fuels, and one or more renewable power utilities, initiate the hydrocarbon product operation at a corresponding blending site with the one or more petroleum products and the one or more agricultural fuels, the operation to utilize the selected one or more renewable power utilities, the corresponding blending site to combine the one or more petroleum products and the one or more agricultural fuels, while utilizing the one or more renewable power utilities, thereby forming a low carbon intensity hydrocarbon product.

Another embodiment of the disclosure is directed to a method to efficiently integrate alternative energy with a hydrocarbon product, the efficient integration associated with various aspects of alternative energy production, procurement, and transportation and various aspects of petroleum product production, procurement, and transportation. The method may include determining a first intersection of renewable power utilities and petroleum product production at a refinery for a hydrocarbon product production, based on a petroleum product production time interval and renewable power utility availability. The method may further include determining a second intersection of agricultural fuel production at an agricultural fuel site and petroleum product production at the refinery for the hydrocarbon product production, based on the petroleum product production time interval, an agricultural fuel production time interval, and available stored agricultural fuel. The method may further include determining a third intersection of agricultural fuel production at the agricultural fuel site and renewable power utilities for the hydrocarbon product production, based on the agricultural fuel production time interval and renewable power availability. The method may further include determining efficiency of a fourth intersection of agricultural fuel production at the agricultural fuel site, renewable power utilities for the hydrocarbon product production, and petroleum product production at the refinery, based on the petroleum product production time interval, renewable power utility availability, an agricultural fuel production time interval, and available stored agricultural fuel. The method may further include, in response to a determination that the efficiency of the fourth intersection is greater than or equal to a threshold efficiency, selecting options associated with the fourth intersection. The method may further include, in response to a determination that the efficiency of the fourth intersection is less than the threshold efficiency, selecting options associated with one or more of the first intersection, second intersection, and third intersection. The method may further include in response to a selection including agricultural fuel production, initiating agricultural fuel production at the agricultural fuel site with a specified agricultural feedstock and specified agricultural options thereby converting the agricultural feedstock to an agricultural fuel for use in the hydrocarbon product production. The method may further include, in response to a selection including petroleum product production, initiating petroleum product production at the refinery with a specified feedstock and specified petroleum product options thereby converting the specified feedstock to a petroleum product for use in the hydrocarbon product production. The method may further include in response to a selection including renewable power utilities, utilizing renewable power during specified portions of the hydrocarbon product production. The method may further include combining any produced and specified petroleum products with any produced and specified agricultural fuel, thereby forming the hydrocarbon product. The method may further include maintaining a record that is associated with the selected options and petroleum product production, the record detailing the carbon intensity of each selected option and petroleum products to be provided to an end user.

Another embodiment of the disclosure is directed to a method to efficiently integrate alternative energy with a hydrocarbon product, the integration associated with various aspects of alternative energy production, procurement, and transportation and various aspects of petroleum product production, procurement, and transportation. The method may include determining availability of renewable power for use at one or more agricultural fuel related sites and one or more petroleum product related sites. The method may include determining availability of agricultural fuel products for use at one or more renewable power related sites and the one or more petroleum product related sites. The method may include selecting one or more of the available renewable power for use at the one or more agricultural fuel related sites, the available renewable power for use at one or more petroleum product related sites, available agricultural fuel products for use at the one or more renewable power related sites, and available agricultural fuel products for use at the one or more petroleum product related sites. The method may include initiating hydrocarbon product production based on the selections and thereby converting specified feedstock at corresponding sites into hydrocarbon products. The method may include maintaining a record of carbon intensity of the hydrocarbon products based on a carbon intensity of the selected available renewable power, a carbon intensity of the selected available agricultural fuel products, and a carbon intensity of selected one or more petroleum products.

Another embodiment of the disclosure is directed to a fuel integration controller to operate one or more agricultural fuel related sites and petroleum fuel related sites for distribution of a low carbon intensity (CI) transportation fuel obtained through one or more targeted reductions of carbon emissions (CE) associated with various available renewable power sources, available agricultural fuel, and available petroleum fuel related CI improvements. The fuel integration controller may include a first input/output in signal communication with an agricultural fuel controller, the agricultural fuel controller to control various aspects of agricultural fuel production. The fuel integration controller may be configured to, in relation to the agricultural fuel controller, determine one or more available agricultural fuels from one or more agricultural fuel sources at a first time interval. The fuel integration controller may further be configured to determine carbon intensity of the one or more available agricultural fuels at the first time interval based on two or more of: a type of feedstock utilized to produce the one or more available agricultural fuels; a type of transportation utilized to transport the type of feedstock to an agricultural fuel facility; utilities utilized to produce the one or more available agricultural fuels; or one or more agricultural fuel facility processes utilized to produce the one or more available agricultural fuels. The fuel integration controller may further be configured to initiate production of one or more available agricultural fuels based on carbon intensity and time for completion of the production in relation to the first time interval.

The fuel integration controller may include a second input/output in signal communication with a renewable power controller, the renewable power controller to control various aspects of renewable power production. The fuel integration controller may be configured, in relation to the renewable power controller, to determine a second time interval associated with availability of renewable power from one or more renewable power sources. The fuel integration controller may be configured to determine carbon intensity of the renewable power at the second time interval provided from the one or more renewable power sources based on a distance from the one or more renewable power sources to a destination.

The fuel integration controller may include a third input/output in signal communication with a petroleum product controller, the petroleum product controller to control various aspects of transportation fuel production. The fuel integration controller may be configured, in relation to the petroleum product controller, to determine a third time interval for transportation fuel production. The fuel integration controller may be configured to, in response to a determination that the third time interval is equal to or later than the first time interval, select the one or more available agricultural fuels, based on the carbon intensity of the one or more available agricultural fuels, for the transportation fuel production. The fuel integration controller may be configured to, in response to a determination that the third time interval is about equal to the second time interval, select the renewable power for the transportation fuel production. The fuel integration controller may be configured to select options for the transportation fuel production based on carbon intensity and time. The fuel integration controller initiates the transportation fuel production utilizing selections at a refinery, thereby refining specified feedstock and other selected fuels into a transportation fuel. The fuel integration controller may be configuring to determine the carbon intensity of the produced transportation fuel.

Another embodiment of the disclosure is directed to a hydrocarbon product controller to efficiently integrate alternative energy with a hydrocarbon product, the integration associated with various aspects of alternative energy production, procurement, and transportation and various aspects of transportation fuel production, procurement, and transportation. The hydrocarbon product controller may include a first input/output in signal communication with an agricultural fuel controller, the agricultural fuel controller to control various aspects of agricultural fuel production. The hydrocarbon product controller may be configured to, in relation to the agricultural fuel controller, determine one or more available agricultural fuels from one or more agricultural fuel sources at a first time interval. The hydrocarbon product controller may be configured to determine carbon intensity of the one or more available agricultural fuels at the first time interval based on two or more of: a type of feedstock utilized to produce the one or more available agricultural fuels; a type of transportation utilized to transport the type of feedstock to an agricultural fuel facility; utilities utilized to produce the one or more available agricultural fuels; or one or more agricultural fuel facility processes utilized to produce the one or more available agricultural fuels. The hydrocarbon product controller may be configured to initiate production of one or more available agricultural fuels at an agricultural fuel production site, based on time, efficiency, and available renewable power. The hydrocarbon product controller may be configured to, in response to a determination of surplus produced agricultural fuel, initiate prompt to distribute surplus produced agricultural fuel to storage, the prompt including an associated carbon intensity of the surplus produced agricultural fuel.

The hydrocarbon product controller may include a second input/output in signal communication with a renewable power controller, the renewable power controller to control various aspects of renewable power production. The hydrocarbon product controller may be configured to, in relation to the renewable power controller, determine a second time interval associated with availability of renewable power from one or more renewable power sources. The hydrocarbon product controller may be configured to determine carbon intensity of the renewable power at the second time interval provided from the one or more renewable power sources based on a distance from the one or more renewable power sources to a destination.

The hydrocarbon product controller may include a third input/output in signal communication with a petroleum product controller, the petroleum product controller to control various aspects of hydrocarbon product production. The hydrocarbon product controller may be configured to, in relation to the petroleum product controller, determine a third time interval for hydrocarbon product production. The hydrocarbon product controller may be configured to, in response to a determination that the third time interval is equal to or later than the first time interval, select the one or more available agricultural fuels, based on the carbon intensity of the one or more available agricultural fuels, for the hydrocarbon product production. The hydrocarbon product controller may be configured to, in response to a determination that an amount of the surplus produced agricultural fuel is available and that one or more available agricultural fuels is not selected, select the amount of the surplus produced agricultural fuel, based on carbon intensity of the amount of the surplus produced agricultural fuel and a carbon intensity associated with a time period of storing the amount of the surplus produced agricultural fuel, for the hydrocarbon product production. The hydrocarbon product controller may be configured to, in response to a determination that the third time interval is about equal to the second time interval, select the renewable power, based on the carbon intensity of the one or more available agricultural fuels, for the hydrocarbon product production. The hydrocarbon product controller may be configured to select options for the hydrocarbon product production based on carbon intensity and time. The hydrocarbon product controller may be configured to initiate the hydrocarbon product production utilizing selections at a refinery. The hydrocarbon product controller may be configured to determine the carbon intensity of the produced hydrocarbon product.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

Figure 5:
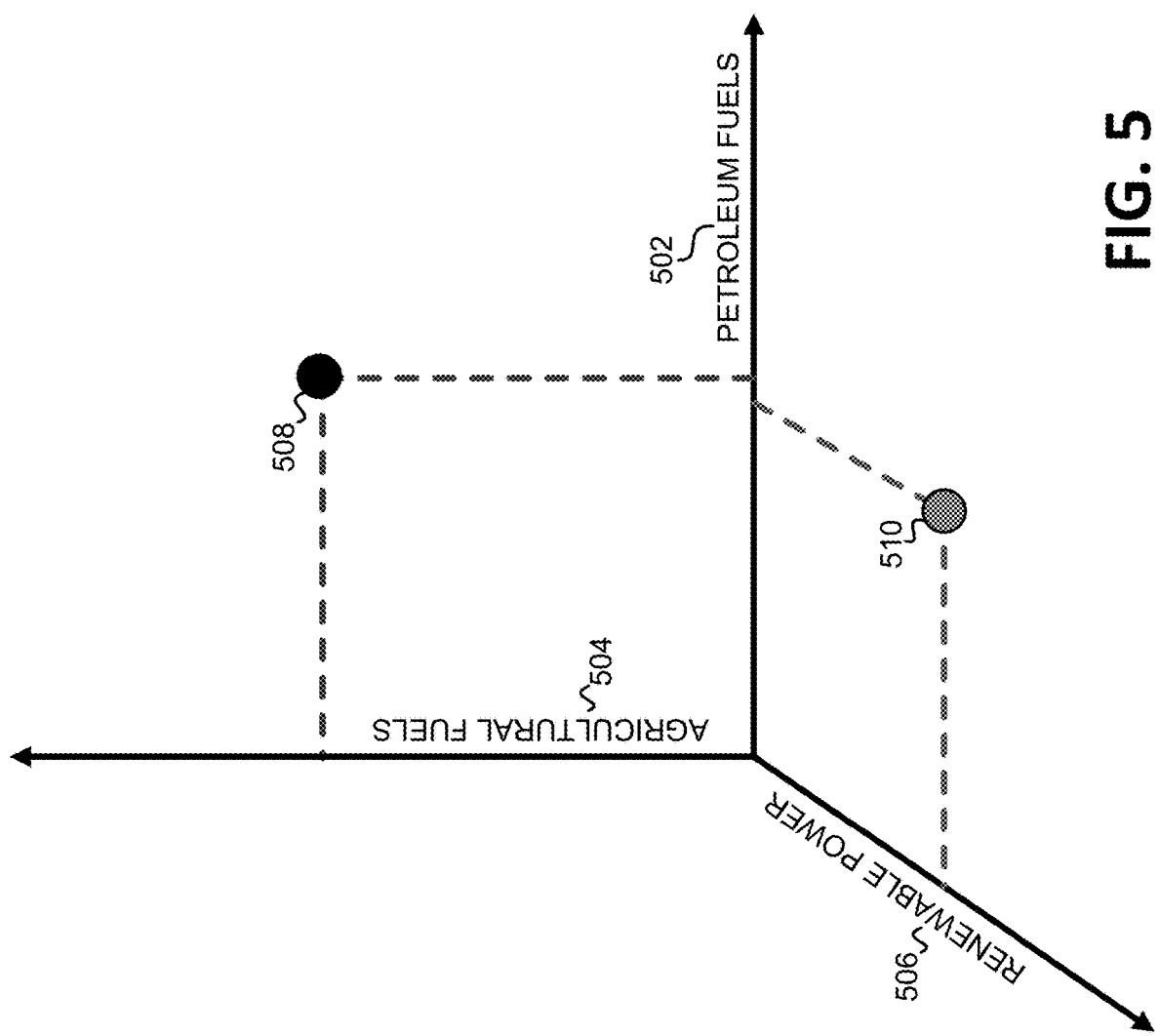
FIGS. 5 through 7 are simplified graphs illustrating integration opportunities of various low carbon intensity applications, according to one or embodiments of the disclosure.

FIG. 5 is a simplified graph illustrating integration opportunities of various low carbon intensity applications. Different forms of fuel and energy may be utilized in conjunction with other forms to increase efficiency and energy density, while also lowering carbon intensity. Such utilizations may occur on two of the axes or via two types of fuel and/or power. Agricultural fuels 504 may be utilized in conjunction with petroleum fuels 502 (see junction 508). For example, an agricultural fuel (e.g., ethanol or biodiesel) may be blended with a petroleum fuel, bio or renewable diesels may be refined using traditional refinery methods, and/or renewable natural gas may be converted to hydrogen. Such a relationship may increase the energy density and lower the overall carbon intensity of the resulting renewable diesel or other petroleum based products. Further, the use of renewable power 506 in conjunction with agricultural fuels 504 may provide promise. Moreover, renewable power 506 may be utilized in conjunction with petroleum fuels 502 (see junction 510). For example, a crude pump may be powered via a wind farm or a waste water treatment plant may be powered via a solar array. However, solutions may utilize all three axes. Typically, each of the axes is discrete and treated as a silo with little to no cooperation between the other axes. Thus, the utilization of all three axes in coordination and over a time interval may be exploited. As such, Applicants have recognized that processes utilizing all three axes may enable production of low carbon intensity and easily accessible (e.g., via conventional methods, such as gas pumps at a convenience store) hydrocarbon products, such as transportation fuel and/or other, typically petroleum based, products.

The present disclosure is directed to systems and methods for the integration of alternative energy into hydrocarbon production. In one or more embodiments, systems and methods for providing a hydrocarbon product integrated with alternative energy to an end user are disclosed. In conventional refining, a suitable feedstock, e.g., a heavy, mid, and/or light crude, is selected, procured, and transported to a refinery. Certain refinery operations, including one or more of distilling, cracking, treating, separating and blending of refined products, are conducted to yield desired hydrocarbon products, such as liquid transportation fuels. Such hydrocarbon products are then transported through various distribution pathways to retail outlets, e.g., convenience stores, for purchase by end user customers. In some examples, the hydrocarbon product may be mixed with other hydrocarbon products, such as agricultural fuels (e.g., bio/renewable diesel, bio-gasoline, ethanol, etc.). In other examples, agricultural fuels may be blended with the feedstock prior to refining. In yet another example, to reduce carbon intensity, a crude pump may be powered via a wind farm or a waste water treatment plant may be powered via a solar array. However, no solutions exist that fully consider or utilize alternative energy integration into refinery operations.

Further, alternative energies may be dependent on time. In other words, different types of alternative energies may be available at different time periods or intervals. For example, energy produced via a wind farm may be available during certain weather conditions. In other weather conditions, the wind farm may not produce any energy. While battery banks may store surplus energy, the batteries may increase CI based on the type of battery (e.g., chemicals used). Such an intermittent power source may not be relied upon solely and has not been relied upon in relation to agricultural fuels and petroleum products. For agricultural fuels, which may be considered alternative energy and hydrocarbon fuels, availability may be dependent on a number of factors, such as surplus crops, availability of used oil or grease, availability of animal byproducts, availability of varying waste products, and so on. While not as unpredictable as renewable power, agricultural fuel may experience shortages, based on the factors noted above. Typical petroleum fuels, while dependent upon feedstock, are generally available on a continuous basis. The issue is how intermittent energies are integrated the with the continuous energies, while still maintaining or increasing efficiency, potentially lowering carbon intensity, and performing such integrations over a lengthy and/or continuous period of hydrocarbon product production or operation.

The feedstock selected for the production of hydrocarbon products have an initial or inherent carbon intensity, which is expressed as grams of carbon dioxide per unit energy. This initial or inherent carbon intensity represents the carbon emissions that would result if the feedstock—in its natural state without consideration of any pre- or post-processing—were to be combusted completely, e.g., complete combustion of the hydrocarbons to carbon dioxide and water based on stoichiometric combustion as would be understood by those skilled in the art. Nonetheless, it should be noted that this inherent or initial carbon intensity of the raw feedstock (i.e., of its fuel value) may often be the largest contributor to the overall carbon intensity of any transportation fuel that is produced therefrom. However, the procuring of such feedstock, the refining of those feedstock into hydrocarbon products, and distribution of those hydrocarbon products to the end user (in other words, each stage of fuel production) each may incrementally increase (or decrease) the carbon intensity of the final hydrocarbon products purchased by the end user. The carbon intensity of the final transportation fuel is increased if carbon emissions expressed as grams of carbon dioxide equivalent per unit energy—result from such activities. For example, the determined grams of carbon dioxide equivalent per unit energy evolved as a result of the activity is added to the initial or inherent carbon intensity of the material that is the subject of the activity. Conversely, if activities that sequester carbon or mitigate the release of carbon emissions are employed, the carbon emissions may be negative or just slightly positive such that the carbon intensity of the transportation fuel is reduced or increases only slightly as a result of the activity.

In some embodiments disclosed herein, the systems and methods may provide for low carbon intensity hydrocarbon products produced through one or more targeted reductions of carbon emissions and selected intersections associated with various options for feedstock procurement, feedstock transportation, feedstock processing, and hydrocarbon product distribution pathways. Renewable energy sources, such as power generated from wind, solar, geothermal, and hydroelectric generators as well as renewable feedstock obtained from biomass sources (e.g., plant crops/waste or animal waste), may be used to reduce the carbon emissions of these various options, based on the availability of the renewable power and other factors. The resulting hydrocarbon products have a lower carbon intensity because the low carbon intensity alternative energy sources are integrated into the hydrocarbon product during feedstock selection, transportation, processing/refining, and product distribution. The integration of alternative, renewable energy sources, which may be co-located geographically with conventional refineries and other hydrocarbon product processing facilities, reduces the added carbon intensity of transporting such energy directly to the consumer. The consumer purchaser of these lower carbon intensity hydrocarbon product and other refined/processed products benefits in at least two ways: First, conventional hydrocarbon products are made available with carbon intensities that have been at least partially offset by processing steps that use the lower carbon intensities of alternative, renewable energies, such that lower carbon intensities of the alternative, renewable energies are integrated into the verifiably lower carbon intensity hydrocarbon products, such as transportation fuel. Second, such low carbon hydrocarbon products may be readily purchased from traditional retail outlets, such as convenience stores, without the consumer needing to purchase special vehicles and/or equipment, e.g., electric vehicles, to take advantage of the low carbon intensity energy afforded by alternative, renewable energy sources.

Figure 1:
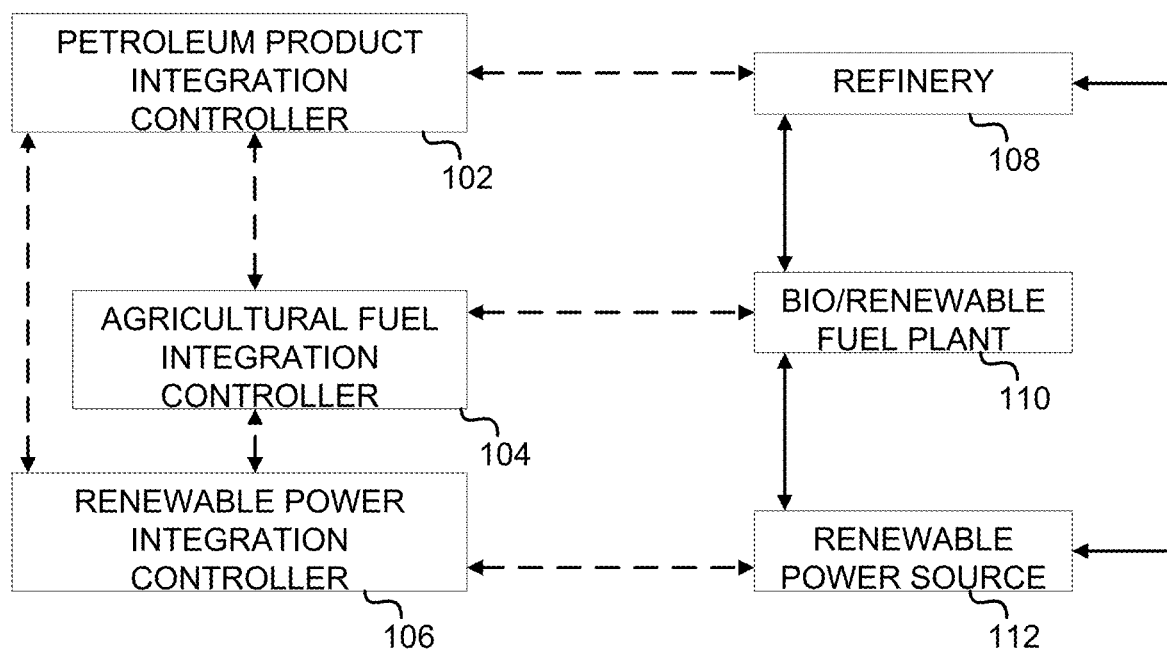
FIG. 1 is a simplified diagram illustrating a control system for managing the integration of alternative energy into hydrocarbon production, according to one or more embodiments of the disclosure.

FIG. 1 is a simplified diagram illustrating a control system 100 for managing the integration of alternative energy into hydrocarbon products and/or production, according to one or more embodiments of the disclosure. Such a control system 100 may include various controllers to control, maintain information related to, and operate, in conjunction and/or continuously or in batches, different aspects of hydrocarbon production. The hydrocarbon production may occur in continuous or in batch operations. The control system 100 may include a petroleum product integration controller 102. The petroleum product integration controller 102 may be in signal communication with a refinery 108 to obtain information on and control various aspects of a refinery 108. For example, the petroleum product integration controller 102 may connect with the refinery 108 (e.g., via a controller or a computing device at the refinery). In another example, the petroleum product integration controller 102 may be located at the refinery 108 and include the functionality of a refinery controller. The petroleum product integration controller 102 may determine operation options available at the refinery 108 or multiple refineries. Further, the petroleum product integration controller 102 may set different options for and initiate operations at the refinery 108. For example, the petroleum product integration controller 102 may set the utilities to be used at a refinery 108, initiate refinery operations, set run times for different hydrocarbon product operations, set how byproducts are disposed of (e.g., re-used or released into the atmosphere), and/or control sub-processes of a refinery 108 (steam reformer, hydrocracker, hydrotreater, fractionation, distillation, burners, furnaces, etc.).

The petroleum product integration controller 102 may connect with other controllers of the control system to determine what options or intersections are available, in regards to alternative energy. As used herein, "integration controller" may refer to a controller which may orchestrate or set various options for a particular operation based on various factors (e.g., integrating renewable power in various aspects at a refinery 108). The petroleum product integration controller 102 may determine when and how such alternative energy may be integrated into hydrocarbon product operations at the refinery 108. For example, the petroleum product integration controller 102 may determine available renewable power sources 112 from the renewable power integration controller 106. Various factors may be considered when determining whether a renewable power from a renewable power source 112 may be utilized, such as efficiency, cost, distance, time, and/or other factors. In another example, the petroleum product integration controller 102 may be in signal communication with an agricultural fuel integration controller 104 to determine the type and availability of an agricultural fuel from a bio/renewable fuel plant 110. For example, the petroleum product integration controller 102 may determine that a particular type of gasoline is to be produced. The petroleum product integration controller 102 may determine whether a bio-gasoline may be dropped in or whether ethanol may be mixed with the gasoline. In such examples, the efficiency, cost, distance, time, and/or other factors may be utilized to determine whether the agricultural fuel may be used in the final hydrocarbon product. Based on any of these available alternative energies, the petroleum product integration controller 102 may set different options within a refinery 108 (or other refineries, blending operations, or other processes).

In another example, the agricultural fuel integration controller 104 may determine available renewable power sources 112 from the renewable power integration controller 106 for use in an agricultural fuel production process. As used herein, 'agricultural fuel' may refer to biodiesel, renewable diesel, biofuel, bio-gasoline, pyrolysis oil, or any fuel derived from plant and/or animal based feedstock. The agricultural fuel integration controller 104 may determine whether one-time improvements are available for a bio/renewable fuel plant 110, such as constructing a renewable power source (e.g., wind farm, solar array, geothermal generator, and/or hydrogen fuel cell power station) nearby or proximate to the bio/renewable fuel plant 110. The agricultural fuel integration controller 104 may consider a variety of factors in such a determination, such as amount of land available and potential land use (e.g., land potentially used for crops versus renewable power generation).

As used herein, "renewable natural gas" is natural gas that is derived from the decomposition of organic wastes materials, such as food, animal, and agricultural wastes, garden and lawn clippings, organic materials in landfills, and waste paper, cardboard and wood products. As used herein, "fermentable feedstock" may refer to a variety of different feedstock, each including an amount of starch, which may be converted to sugar, or sugar. A typical fermentable feedstock may be corn. Other fermentable feedstock may include wheat, barley, rice, other grains, fruits, vegetables, other vegetation, other organic matter, other organic waste, sugar solutions, or any other material including an amount of starch and/or sugar.

Each controller described above and herein may include a machine-readable storage medium and one or more processors. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory may store or include instructions executable by the processor. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

Figure 2:
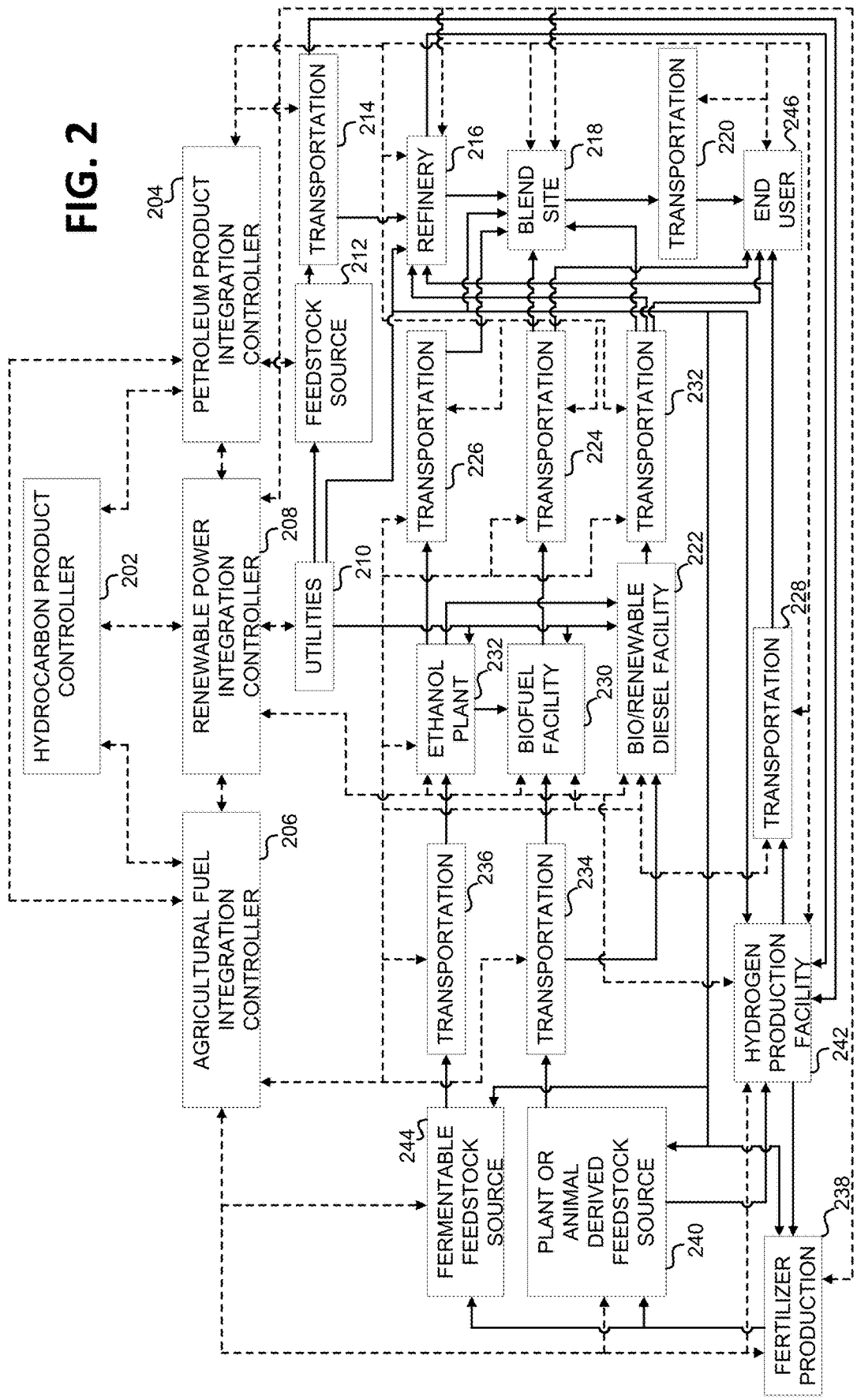
FIG. 2 is a simplified diagram illustrating various aspects of hydrocarbon production and a controller for managing the integration of alternative energy into the various aspects of hydrocarbon production, according to one or more embodiments of the disclosure
Figure 3A:
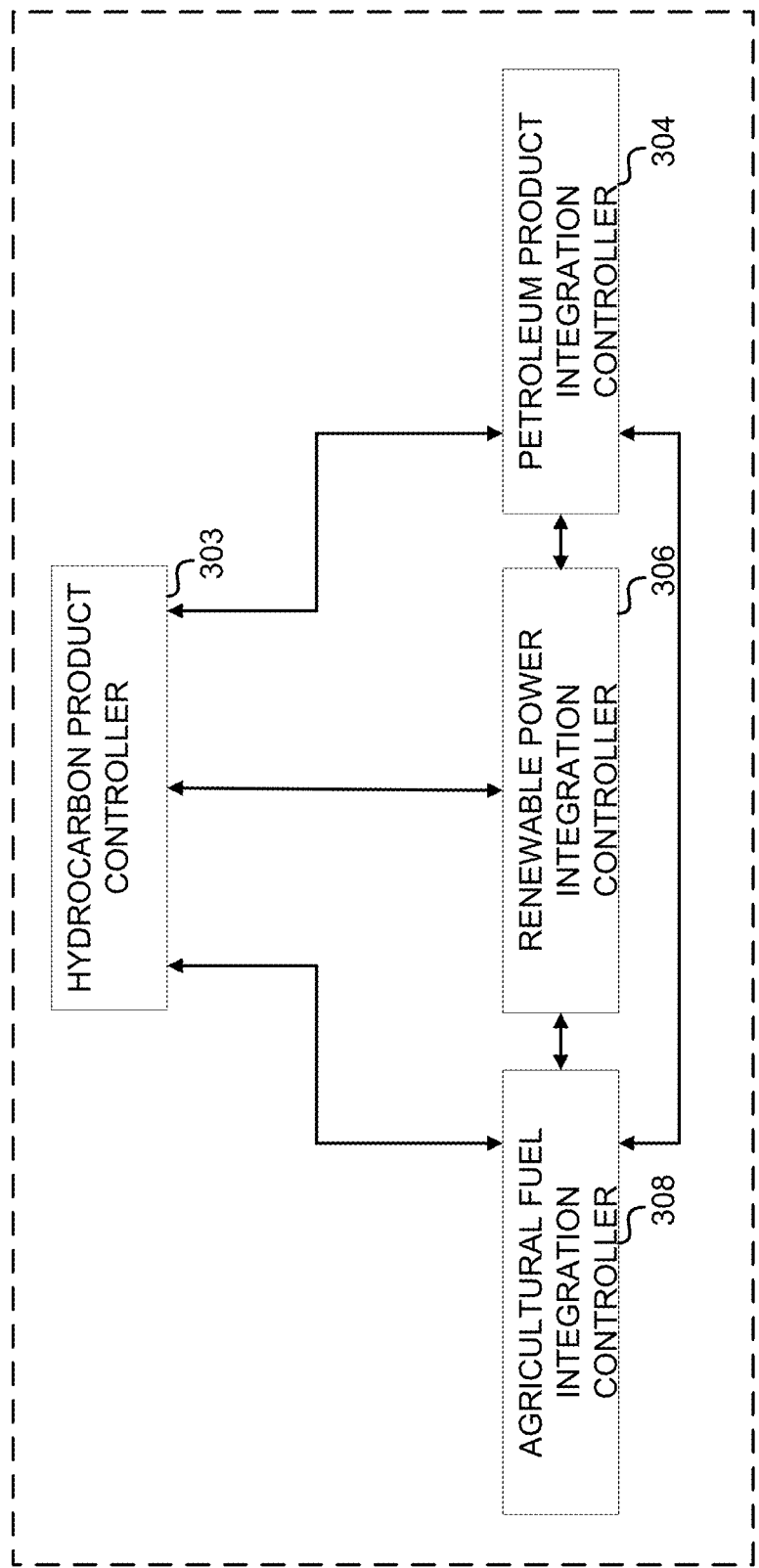
FIGS. 3A and 3B are simplified diagrams illustrating a control system for managing the integration of alternative energy into hydrocarbon production, according to one or more embodiments of the disclosure.
Figure 3B:
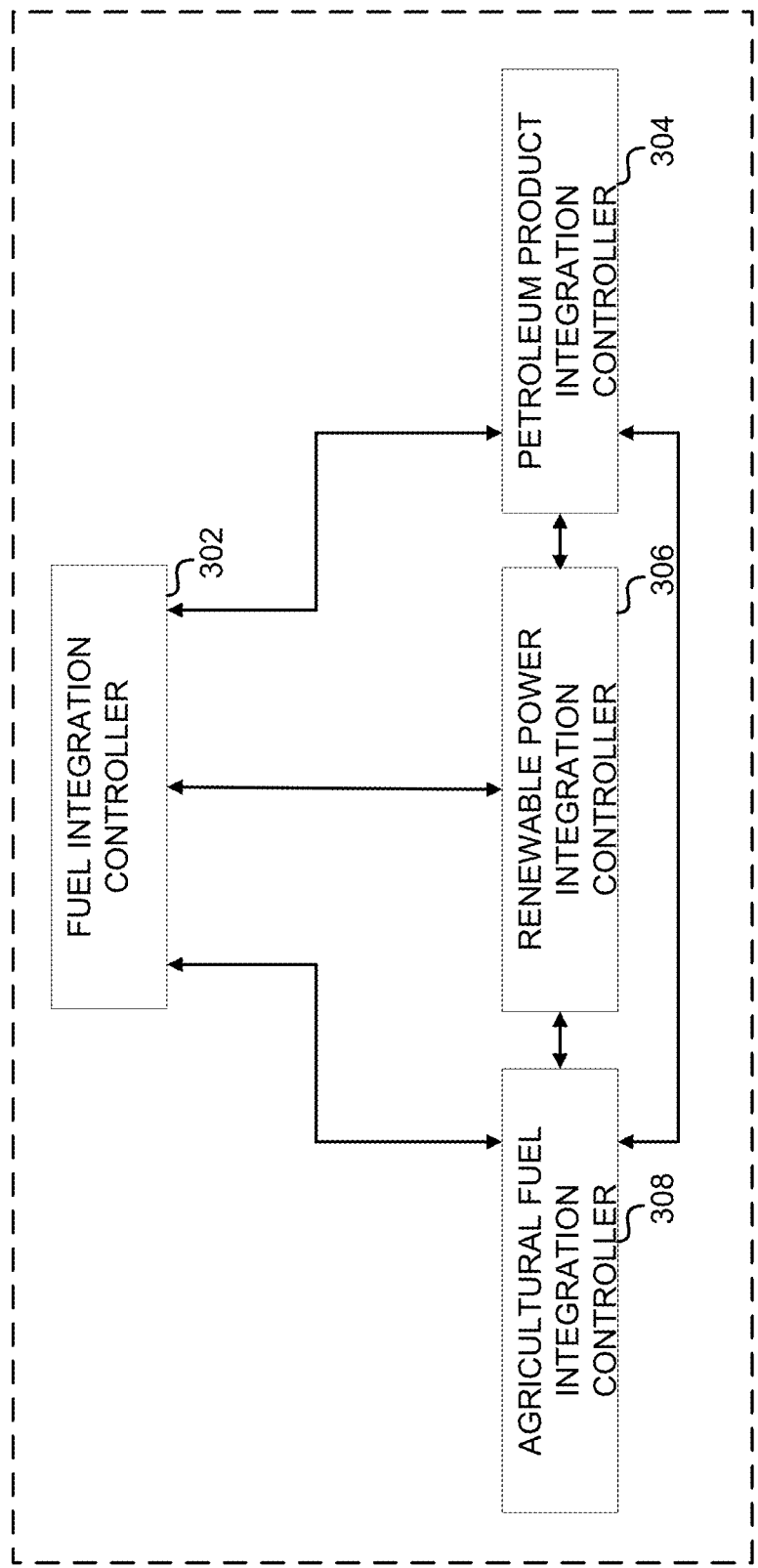

FIGS. 2, 3A, and 3B are simplified diagrams illustrating various aspects of hydrocarbon production and a hydrocarbon product controller 202 for managing the integration of alternative energy into the various aspects of hydrocarbon production, according to one or more embodiments of the disclosure. Such a control system may include a hydrocarbon product controller 202 or a fuel integration controller 302. The hydrocarbon product controller 202 may determine availabilities of different alternative energies and hydrocarbon based products. The hydrocarbon product controller 202 may orchestrate the hydrocarbon product process or operation of one or more petroleum fuel related sites or other sites (e.g., select specific options based on time or availability, efficiency, carbon intensity of each process or sub-process, length of time of the process, a total carbon intensity, and/or other factors related to a hydrocarbon production process or operation). Such orchestration or selection may occur automatically or at the prompt of a user. The hydrocarbon product controller 202 may connect to various other controllers described above, such as a petroleum product integration controller 204, renewable power integration controller 208, and an agricultural fuel integration controller 206.

As noted, the hydrocarbon product controller 202 may be in signal communication with an agricultural fuel integration controller 206 or may include the functionality of the agricultural fuel integration controller 206. The hydrocarbon product controller 202 may, via the agricultural fuel integration controller 206, select various options based on an agricultural fuel production process to produce a particular agricultural fuel (e.g., ethanol, biodiesel, renewable diesel, or biofuel). The various options may include production of a specified agricultural fuel, use of renewable utilities, type of feedstock, options to potentially reduce CI of the feedstock and/or bio/renewable fuel at a plant/facility, and/or types of transportation and/or distribution. The hydrocarbon product controller 202 may, via the agricultural fuel integration controller 206, select the various options based on specified options for a hydrocarbon production process from the hydrocarbon product controller 202. Such options may be defined as carbon intensity, efficiency, cost, and/or time of availability.

The agricultural fuel integration controller 206 and/or the hydrocarbon product controller 202 directly or indirectly may connect to and control various agricultural fuel related processes (e.g., via signal communication with other controllers and/or computing devices). The agricultural fuel integration controller 206 may connect to, control, and/or obtain information regarding one or more fermentable feedstock sources 244 and/or one or more plant or animal derived feedstock source 240. The information may include a type of feedstock, physical location of the feedstock, type of storage associated with the feedstock, time of availability for the feedstock, type of equipment utilized to obtain or procure the feedstock (e.g., farming equipment, pumps, and so on), fuel used by the equipment, type of fertilizer used at a feedstock source, water used at the source for the feedstock, and/or types of transportation associated with the feedstock or its source. The agricultural fuel integration controller 206 may determine carbon intensity for each available feedstock. The carbon intensity may be based on the information described above. Further, the agricultural fuel integration controller 206 may select the type of transportation 234, 236 (e.g., vehicular, rail, pipeline, and/or marine vessel) to transport the feedstock to either an ethanol plant 232, a biofuel facility 230, a bio/renewable diesel facility, a hydrogen production facility 242, and/or feedstock storage. The agricultural fuel integration controller 206 may select the type of transportation based on the fuel utilized by the transportation, the volume of the transportation, the type of feedstock, and/or the distance to deliver the feedstock.

The agricultural fuel integration controller 206 may further consider transportation carbon intensity in relation to energy density. In other words, an unprocessed agricultural feedstock may initially have a low energy density. As the agricultural feedstock is processed into an agricultural fuel, the energy density may increase. Further, if an agricultural fuel is mixed with a petroleum product, the energy density may be increased further still. Thus, as energy density increases the volume of transportation or distribution may be reduced in relation to carbon intensity (e.g., carbon intensity of transportation for an unprocessed feedstock may be higher versus transportation for a processed and blended fuel).

The agricultural fuel integration controller 206 may connect to and control various one or more agricultural fuel sites or facilities. For example, the agricultural fuel integration controller 206 may connect to agricultural fuel production sites, such as an ethanol plant 232, a biofuel facility 230 or plant, a bio/renewable facility, or a hydrogen production facility 242. The agricultural fuel integration controller 206 may select various aspects of and gather information associated with the agricultural fuel production sites. For example, at an agricultural fuel site, the agricultural fuel integration controller 206 may determine or select options, in conjunction with other controllers (e.g., the hydrocarbon product controller 202, the renewable power integration controller 208, and/or the petroleum product integration controller 204), for a particular hydrocarbon product production. Options may include whether the agricultural fuel site may capture carbon (e.g., carbon sequestration), use heat integration, connect to a renewable power source (off-grid, or grid-tied), and/or utilize renewable natural gas. The agricultural fuel integration controller 206 may select the options based on various factors such as a total carbon intensity for the hydrocarbon product production, the carbon intensity for each option, the carbon intensity for each part or process of the hydrocarbon product production, cost, time/availability, and/or other factors. In other examples, the agricultural fuel integration controller 206 may select the type of transportation to deliver the agricultural fuel to an end user (e.g., a refinery, a blending operation, or a convenience store).

For example, the agricultural fuel integration controller 206 may receive a request (e.g., from the hydrocarbon product controller) or specific instructions to produce a particular type of agricultural fuel for a hydrocarbon production. In other examples, the hydrocarbon product controller 202 may select the options available at the agricultural fuel integration controller 206 at that particular point in time (e.g., options available may change over time) and transfer such selections for initiation to the agricultural fuel integration controller 206. In either example, the agricultural fuel integration controller 206 or hydrocarbon product controller 202 may determine a total carbon intensity, availability, and efficiency of many combinations based on the available options. In another example, the agricultural fuel integration controller 206 or hydrocarbon product controller 202 may determine when to produce and store large quantities of agricultural fuel for storage and later use. For example, if renewable power is available for a certain period of time, even though no request has been received, the agricultural fuel integration controller 206 or hydrocarbon product controller 202 may initiate production of agricultural fuel. Other factors may be considered, such as feedstock availability (e.g., a particular feedstock is in surplus at a particular time and may be purchased at a lower than typical cost), efficiency (e.g., a particular feedstock that is easier to process for a certain type of agricultural fuel is available), cost, and/or other factors. Based on these factors or conditions, the agricultural fuel may be produced and stored. The storage tank or other storage facility may include a controller, memory, physical media, or another storage device where the carbon intensity, and all the other aspects of the produced agricultural fuel (e.g., power used, type of feedstock, volume of feedstock, volume of yield, fertilizer used for feedstock, among other factors), may be stored for later reference. For example, if an ultra-low carbon intensity agricultural fuel has been stored, the hydrocarbon product controller 202 may determine whether the stored ultra-low carbon intensity agricultural fuel may be used in hydrocarbon production. In other words, the low carbon intensity fuel may be utilized to produce a low CI hydrocarbon fuel, for future use (e.g., 'deposit' into the bank during a surplus and 'withdraw' when no viable option for agricultural fuel production exists). Further, such storing of agricultural fuels allows for an advantage over time. In other words, since agricultural fuel production may be cyclical or seasonal banking or storing an amount of agricultural fuel may allow for time to become a non-issue (e.g., availability is not an issue after sufficient stock is built up).

In another example, the hydrocarbon product controller 202 may connect to a renewable power integration controller 208 or include the functionality of the renewable power integration controller 208. In such examples, the renewable power integration controller 208 may be in signal communication with and/or control with a controller or computing device at a utilities site 210. The renewable power integration controller 208 may provide a list of available renewable power options at the utilities site 210 (e.g., time of availability of the renewable power) and/or determine other renewable based improvements. For example, the renewable power integration controller 208 may determine whether construction of a renewable power site nearby or proximate to an agricultural fuel site or petroleum product site is feasible. For example, an analysis of construction may be performed and, based on such analysis, the renewable power integration controller 208 may signal a recommendation to initiate or prompt initiation of construction of such a renewable power site. As noted, renewable power may include wind, solar, hydroelectric, hydrogen fuel cells, geothermal, and/or other low carbon intensity renewable power options.

The hydrocarbon product controller 202 may connect to a petroleum product integration controller 204 or include the functionality of a petroleum product integration controller 204. The petroleum product integration controller 204 may select or determine a set of options related to a refinery 216 or other petroleum product processes (e.g., blending at a blend site 218) for petroleum product operations. The petroleum product integration controller 204 may determine options available, such as what type of utilities are used, type of transportation and distribution utilized for feedstock and petroleum products, respectively, whether heat integration may be used, whether carbon capture (which may include capture of other chemicals) is used, whether agricultural fuels are to be mixed with a product from a refinery 216, whether refinery 216 byproducts are re-used or distributed for use in other processes, whether renewable natural gas may be used in boilers and/or furnaces, the type of feedstock to be utilized, and whether a renewable feedstock may be utilized as a feedstock for the refinery 216. The petroleum product integration controller 204 may determine the type of petroleum product to be produced and, in some cases, whether a petroleum product is utilized in the hydrocarbon product based on a type of hydrocarbon product to be produced (e.g., 100% agricultural fuel product).

The hydrocarbon product controller 202 may determine the intersection of each aspect of the processes described above. For example, if a particular hydrocarbon product is to be produced, the hydrocarbon product controller 202 may determine when renewable power, agricultural fuel, and/or a petroleum product is available and the efficiency of each. Efficiency may refer to the amount of power utilized in a process, the distance that the energy and power may be transferred, any power loss that may occur, the cost, and/or time. The hydrocarbon product controller 202 may select the options associated with an intersection of the renewable power, the agricultural fuel, and the petroleum product (e.g., the intersection associated with the availability and efficiency of each). In some cases, an intersection of the renewable power, the agricultural fuel, and the petroleum product may not exist. In such cases, one or a combination of the renewable power, the agricultural fuel, and/or the petroleum product may be selected.

Figure 4A:
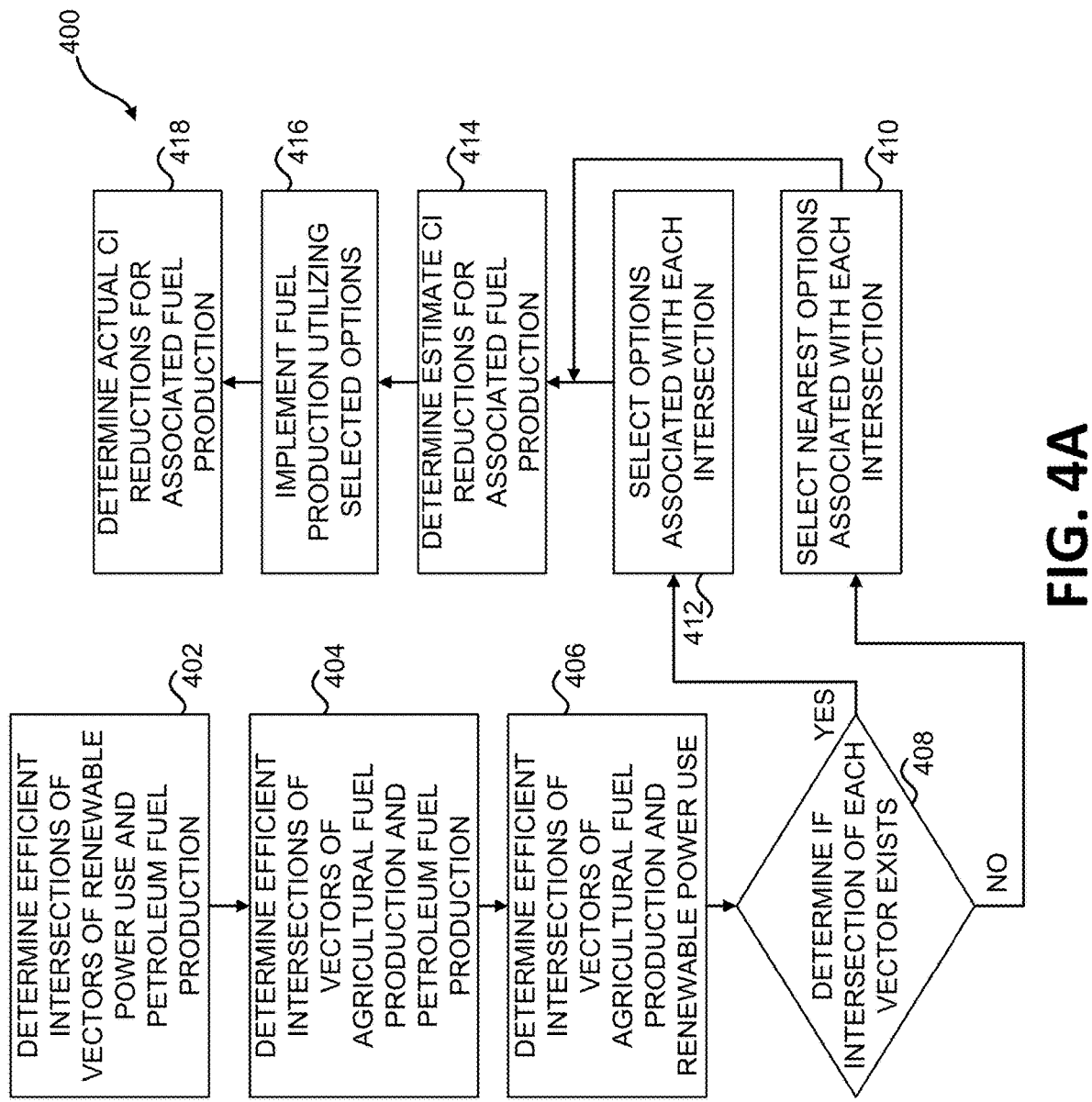
FIGS. 4A and 4B are flow diagrams, implemented in a controller, for managing the integration of alternative energy into hydrocarbon production, according to one or more embodiments of the disclosure.
Figure 4B:
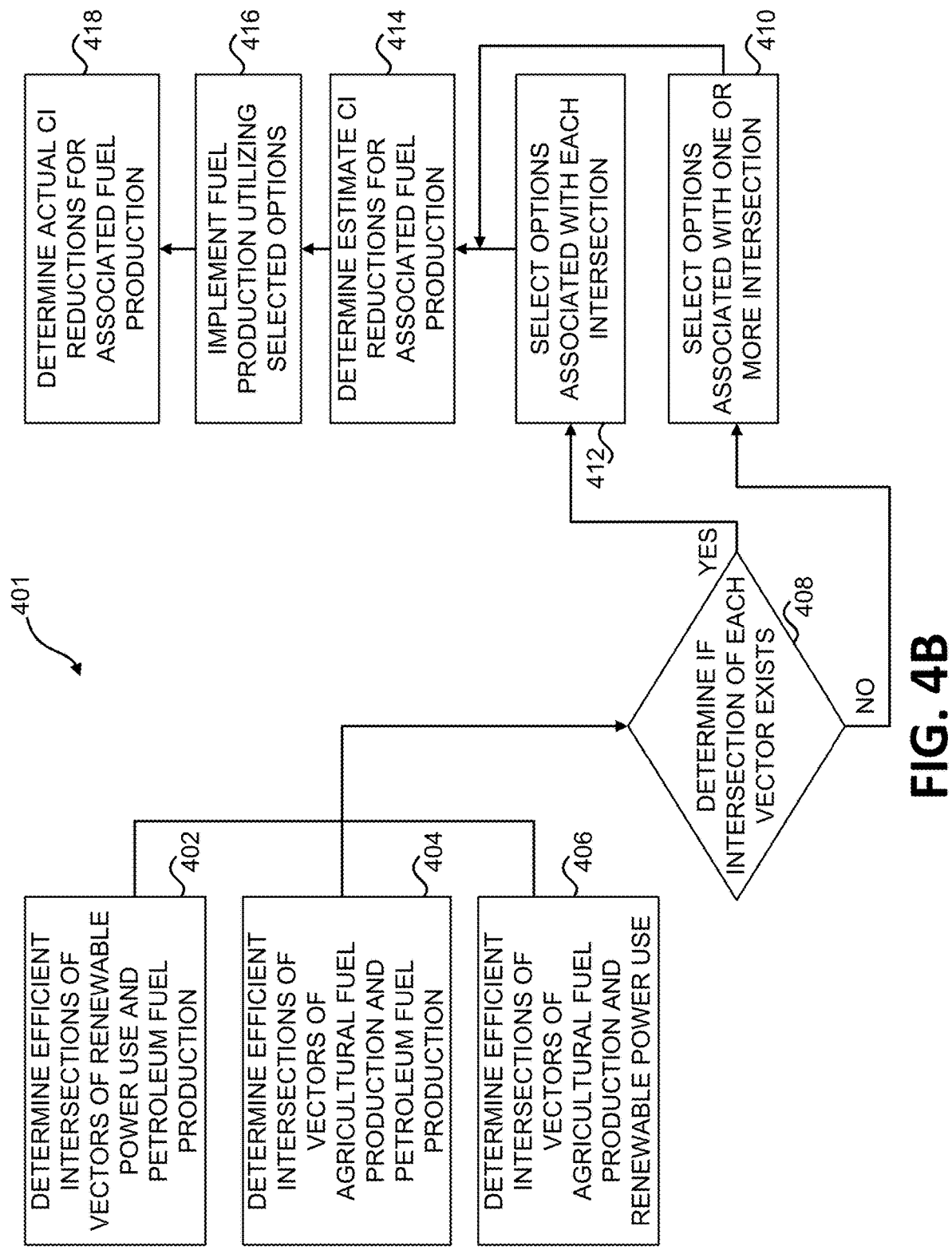

FIGS. 4A and 4B are a simplified diagram that illustrates a novel implementation of a low carbon intensity energy strategy in which lower carbon energy is introduced and used during the acquisition and refining of higher carbon intensity feedstock as well as the distribution of the resulting low carbon intensity fuels to the end user, according to one or more embodiments of the disclosure. The methods 400 and 401 are detailed with reference to the hydrocarbon product controller 202 and system 200 of FIG. 2. Unless otherwise specified, the actions of method 400 and method 401 may be completed within the hydrocarbon product controller 202. Specifically, method 400 and method 401 may be included in one or more programs, protocols, or instructions loaded into the memory of the hydrocarbon product controller 202 or in the agricultural fuel integration controller 206, renewable power integration controller 208, the petroleum product integration controller 204, and/or some combination thereof and executed on the processor or one or more processors of the hydrocarbon product controller 202 or in the agricultural fuel integration controller 206, renewable power integration controller 208, the petroleum product integration controller 204, and/or some combination thereof. The order in which the operations are described is not intended to be construed as a limitation, and any number of the described blocks may be combined in any order and/or in parallel to implement the methods.

At block 402, the hydrocarbon product controller 202 may determine an efficient intersection of vectors of renewable power use and petroleum fuel production. The hydrocarbon product controller 202 may determine, either directly or through the renewable power integration controller 208 and petroleum product integration controller 204, whether a time interval of availability or estimated availability of a renewable power aligns with a time interval of a petroleum fuel production. Further, the hydrocarbon product controller 202 may utilize the carbon intensity and efficiency to determine if such an intersection exists. The intersection may be the point at which renewable power may be integrated with a petroleum product to produce a lower than normal carbon intensity petroleum product at a particular point in time and/or at a particular efficiency. Such an intersection may include various factors of renewable power and petroleum fuel production, such as carbon intensity for both, type of feedstock for the petroleum fuel production, type of transportation for the petroleum fuel production, refinery or processing options for the petroleum fuel production, and/or distance between the utilities site 210 and the refinery 216. Several intersections of the vectors may exist, based on, in an example, the use of renewable power in each of various petroleum fuel production processes (such as, power used to obtain feedstock, transporting feedstock, storing feedstock, operating refinery processes (e.g., hydrocracking, hydrotreating, distillation, fractionation, etc.), distributing petroleum fuel, blending petroleum fuel, and/or distributing blended fuel). For example, renewable power may be available for use in obtaining a feedstock for a particular petroleum fuel production, but may not be available or efficient enough for use at a refinery. The vector of renewable power use may be the amount of renewable power over a period of time. Further, the vector may include other factors, such as efficiency, e.g., cost, resources utilized to produce the renewable power, and/or carbon intensity of the renewable power at any particular point in time. The vector of petroleum fuel production may be the amount of petroleum fuel produced over a period of time. Further, the vector may include other factors, such as efficiency, e.g., cost, resources utilized to produce the renewable power, and/or carbon intensity of the produced petroleum fuel.

At block 404, the hydrocarbon product controller 202 may determine an efficient intersection of vectors of agricultural fuel production and petroleum fuel production. The hydrocarbon product controller 202 may determine, either directly or through the agricultural fuel integration controller 206 and petroleum product integration controller 204, whether a time interval of agricultural fuel production aligns with a time interval of a petroleum fuel production. Further, the hydrocarbon product controller 202 may utilize the carbon intensity and efficiency to determine if such an intersection exists. The intersection may be the point at which agricultural fuel may be integrated with, blended with, or mixed with a petroleum product to produce a lower than normal carbon intensity hydrocarbon product at a particular point in time. Such an intersection may include various factors of agricultural fuel production and petroleum fuel production, such as carbon intensity for both, type of feedstock for the agricultural fuel production and petroleum fuel production, type of transportation for the agricultural fuel production and petroleum fuel production, refinery or processing options for the agricultural fuel production and petroleum fuel production, distance between the refinery 216 and the blend site 218, and/or distance between an agricultural fuel site and the blend site 218. Several intersections of the vectors may exist, based on, in an example, the use of agricultural fuel in each of various petroleum fuel production processes (such as, use in obtaining feedstock, transporting feedstock, storing feedstock, operating refinery processes (e.g., hydrocracking, hydrotreating, distillation, fractionation, etc.), distributing petroleum fuel, blending with petroleum fuel, and/or distributing blended fuel) or the use of petroleum fuel in each of various agricultural fuel production processes (such as, use in obtaining agricultural feedstock, transportation of the agricultural feedstock, processing of the agricultural feedstock to agricultural fuel, and distribution of the agricultural fuel). For example, agricultural fuel may be available for blending with a particular petroleum fuel, but may not be available or efficient enough for use as a fuel or alternative/supplemental feedstock at a refinery. The vector of agricultural fuel production may be the amount of agricultural fuel produced over or stored for a period of time. Further, the vector may include other factors, such as efficiency, e.g., cost, resources utilized to produce the agricultural fuel, and/or carbon intensity of the produced or stored agricultural fuel. The vector of petroleum fuel production may be the amount of petroleum fuel produced over a period of time. Further, the vector may include other factors, such as efficiency, e.g., cost, resources utilized to produce the renewable power, and/or carbon intensity of the produced petroleum fuel.

At block 406, the hydrocarbon product controller 202 may determine an efficient intersection of vectors of renewable power use and agricultural fuel production. The hydrocarbon product controller 202 may determine, either directly or through the renewable power integration controller 208 and agricultural fuel integration controller 206, whether a time interval of availability or estimated availability of a renewable power aligns with a time interval of an agricultural fuel production. Further, the hydrocarbon product controller 202 may utilize the carbon intensity and efficiency to determine if such an intersection exists. The intersection may be the point at which renewable power may be integrated with an agricultural fuel production to produce a lower than normal carbon intensity agricultural fuel product at a particular point in time. Such an intersection may include various factors of renewable power and agricultural fuel production, such as carbon intensity for both, type of feedstock for the agricultural fuel production, type of transportation for the agricultural fuel production, processing options for the agricultural fuel production, and/or distance between the utilities site 210 and the agricultural fuel site. Several intersections of the vectors may exist, based on, in an example, the use of renewable power in each of various agricultural fuel production processes (such as, use in obtaining agricultural feedstock, transportation of the agricultural feedstock, processing of the agricultural feedstock to agricultural fuel, and distribution of the agricultural fuel). For example, renewable power may be available for use in obtaining a feedstock for a particular agricultural fuel production, but may not be available or efficient enough for use at an agricultural fuel production site (e.g., an ethanol plant, bio/renewable diesel plant/facility, or a biofuel site/facility). The vector of agricultural fuel production may be the amount of agricultural fuel produced over or stored for a period of time. Further, the vector may include other factors, such as efficiency, e.g., cost, resources utilized to produce the agricultural fuel, and/or carbon intensity of the produced or stored agricultural fuel.

At block 408, the hydrocarbon product controller 202 may determine if an intersection of each of the vectors exists. Such an intersection may utilize options and selections from all three vectors. As noted, the operations in method 400 and method 401 may be performed in different orders or in parallel. In an example and as illustrated in FIG. 4B, the hydrocarbon product controller 202 may simultaneously perform block 402, block 404, and block 406, assessing many different factors to determine each intersection and/or if each intersection exists or is feasible. In an example, an intersection may not be feasible or exist, if time does not align or if the cost for utilizing such an intersection is prohibitive (e.g., significantly larger than normal). In another example, the hydrocarbon product controller 202 may perform block 402, block 404, block 406, and block 408 in parallel. In such examples, the hydrocarbon product controller 202 may determine the best path based on all available paths, combinations, and/or intersections of each vector. In another example, the hydrocarbon product controller 202 may perform block 402, block 404, and block 406 sequentially. In either embodiment, the hydrocarbon product controller 202 may model various different intersections to determine the best path based on availability and efficiency. Other factors may be utilized, such as available carbon credits, current hydrocarbon products queued for production, and/or one time improvements and/or costs for any of the vectors (e.g., process improvements at a refinery, construction of a renewable power station, etc.).

At block 410, if an efficient intersection of all three vectors does not exist, the hydrocarbon product controller 202 may select options associated with or near the intersections described above. For example, a schedule may be shifted to accommodate a particular selection. In another example, the hydrocarbon product controller 202 may not select an intersection (e.g., no renewable power, no agricultural fuel, no petroleum product, or some combination thereof). At block 412, if an efficient intersection of all three vectors exists, the hydrocarbon product controller 202 may select the options associated with the intersection of all three vectors.

In an example, a threshold may be set to determine which intersection of vectors to utilize. For example, an efficiency threshold or carbon intensity threshold may be set for a particular hydrocarbon product operation. If the intersection of all three vectors (e.g., a fourth intersection) does not meet (e.g., efficiency does not meet the threshold), then options associated with each of the other intersections may be selected. In another example, if the intersection of all three vectors exceeds a threshold (e.g., carbon intensity exceeds the threshold), then options associated with each of the other intersections may be selected. In other words, the hydrocarbon product controller 202 may determine whether a threshold should be met or exceeded, based on the type of threshold (e.g., efficiency, carbon intensity, or other factors). In another example, regardless of whether certain conditions (e.g., efficiency or carbon intensity) are met, the hydrocarbon product controller 202 may choose other options, based on other factors, such as time or cost (e.g., choosing options associated with one or two intersections rather than choosing an available intersection of all three vectors).

At block 414, the hydrocarbon product controller may determine an estimate carbon intensity for the associated hydrocarbon production. At block 416, the hydrocarbon product controller 202 may initiate the hydrocarbon product production or operation. At block 418, the hydrocarbon product controller 202 may, in response to the completion of the hydrocarbon product production or operation, determine the actual carbon intensity for the hydrocarbon product production or operation.

Figure 6:
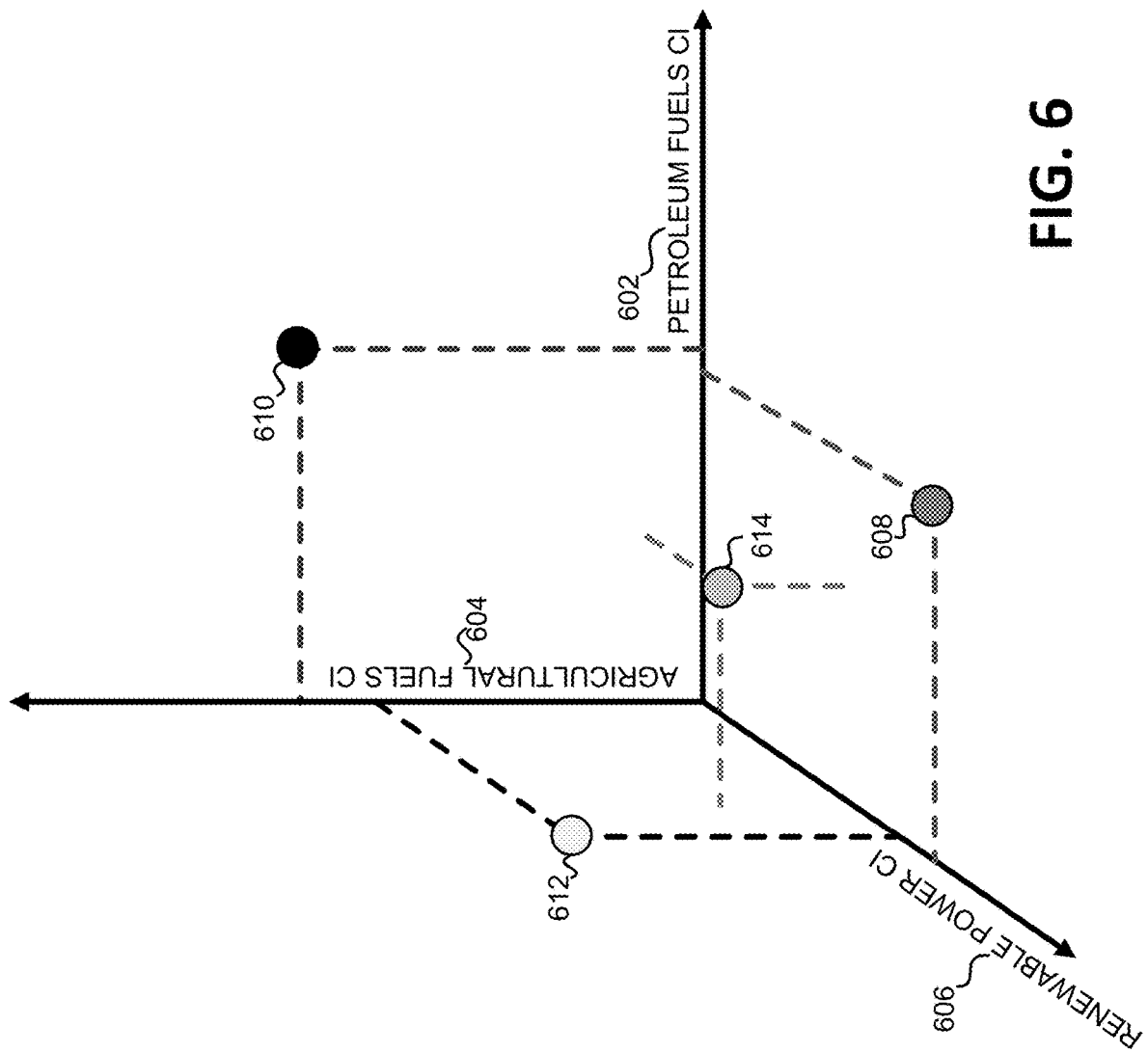

FIG. 6 is a simplified graph illustrating integration opportunities of various low carbon intensity applications, according to one or embodiments of the disclosure. The graph illustrates each of the intersections for each of the alternative energies and hydrocarbon products. Each axes may be a function carbon intensity. As different axes are integrated the total amount of carbon intensity may be reduced. For example, utilizing an agricultural fuel in conjunction with a petroleum product, e.g., junction 610, may reduce a total carbon intensity. Utilizing petroleum fuels in conjunction with renewable power, e.g., junction 604, may further reduce carbon intensity. Further, utilizing agricultural fuels in conjunction with renewable power, e.g., junction 612, may further reduce carbon intensity. Further still, the use of all three in conjunction, e.g., junction 614, may produce the lowest carbon intensity total. While such a combination may be possible and may include the lowest possible carbon intensity, such a combination may or may not be feasible at different points in time or at least not practicable. For example, a combination may include a significantly increased cost as compared to the use of renewable power for a petroleum product.

While the use of all three (petroleum fuel, agricultural fuel, and renewable power) may produce a low carbon intensity hydrocarbon product, the cost may be quite high at different points in time. As such, a hydrocarbon product controller may select one or two intersections. The hydrocarbon product controller may also factor in selections over time. In other words, if the most effective choice at a point in time (e.g., efficient and cost effective) produces a somewhat higher carbon intensity hydrocarbon product, then the hydrocarbon product controller may choose the associated one or more intersections. At a later point in time, to balance such a past selection, the hydrocarbon product controller may select intersections producing the lowest carbon intensity. Thus, an average carbon intensity over time may still qualify as low.

Figure 7:
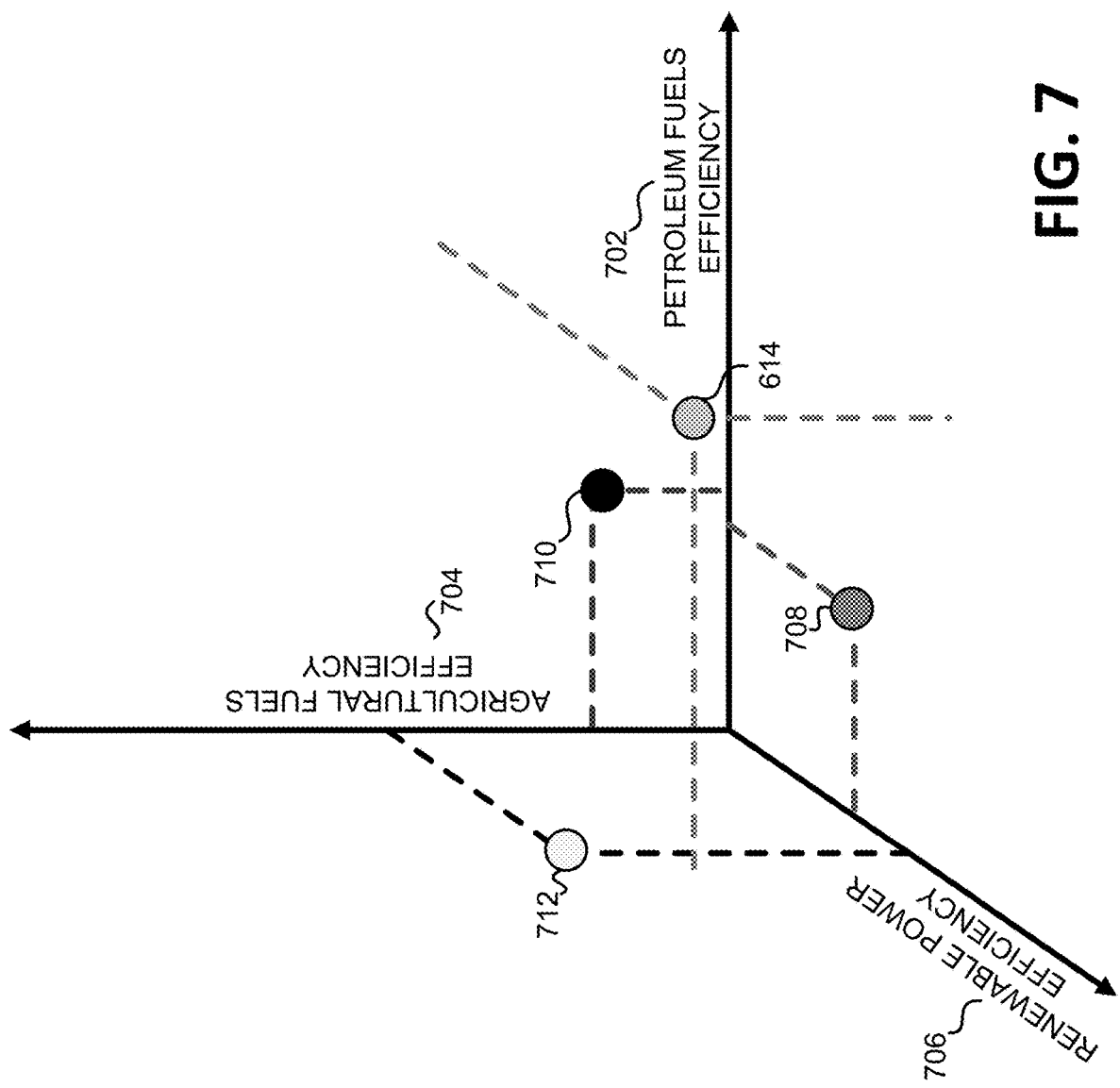

FIG. 7 is a simplified graph illustrating integration opportunities of various low carbon intensity applications, according to one or embodiments of the disclosure. While the points 708, 710, 712, 714 shown on the graph indicate an efficiency, for the purposes of illustrating an example, the points shown on the graph are arbitrary. Each axis 702, 704, 706 in this illustration relates to the efficiency of such a combination. For example, the availability, the time to finish production, cost, other factors, or some combination thereof may contribute to efficiency. As noted, each combination may represent an efficiency. The combination of agricultural fuel and petroleum fuel may vary, depending on the type of agricultural fuel. For example, depending on whether the agricultural fuel is stored or to be produced and when the petroleum product is to be produced may affect efficiency. While all combinations are possible, some combinations may not be practicable.

Figure 8:
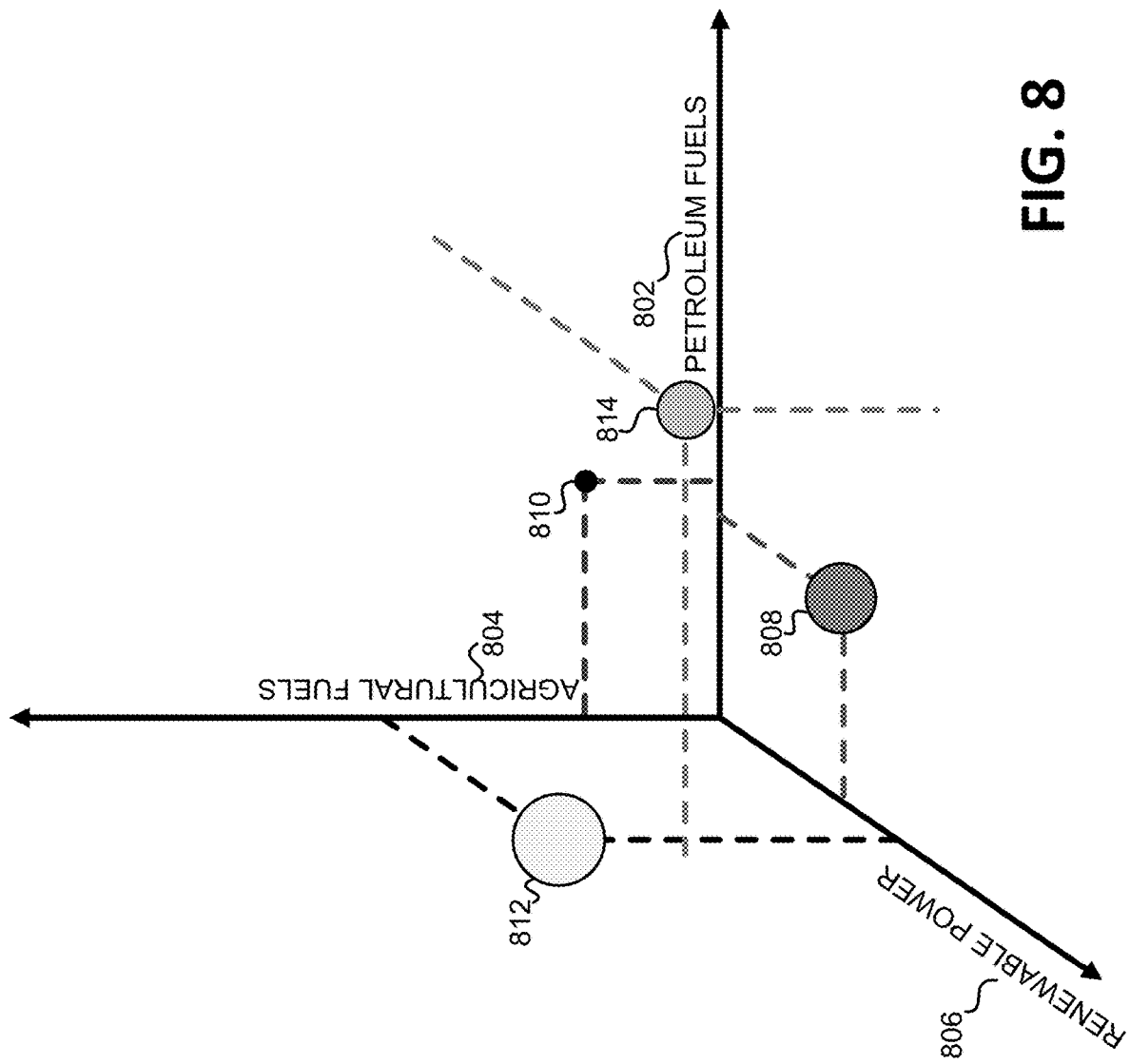
FIGS. 8 through 12 are simplified graphs illustrating integration opportunities of various low carbon intensity applications over time, according to one or embodiments of the disclosure.

FIG. 8 is a simplified graph illustrating integration opportunities of various low carbon intensity applications over time, according to one or embodiments of the disclosure. As illustrated each point 808, 810, 812, 814 may be of a different size and gradient or color. The size of the bubble may represent carbon intensity, while the color may represent another factor, such as efficiency. In another example, the color may represent efficiency, while the size may represent carbon intensity. In another example, the renewable power 806 axis may represent the amount of renewable power to be utilized in relation to traditional fossil fuel generated power.

Figure 9:
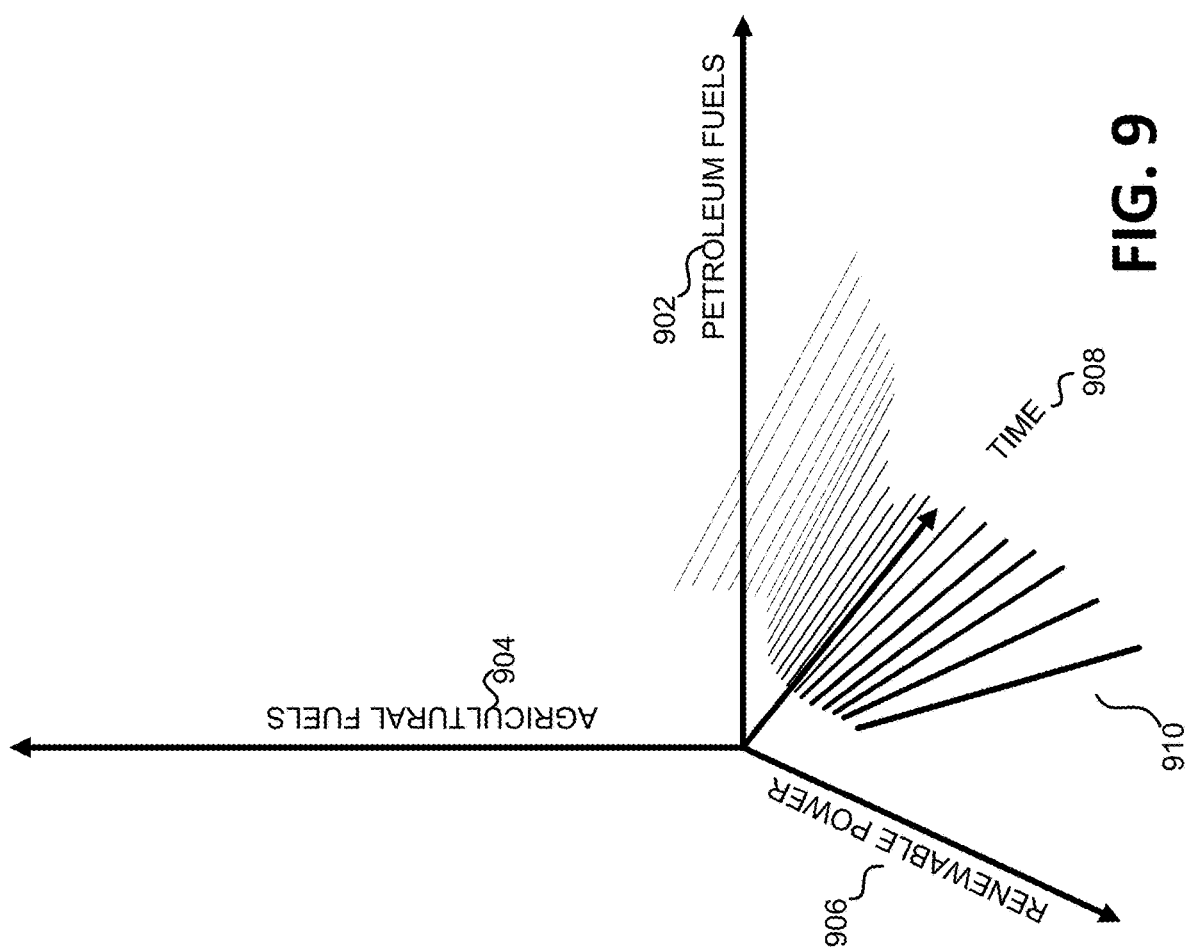

FIG. 9 is a simplified graph illustrating integration opportunities of various low carbon intensity applications over time 908, according to one or embodiments of the disclosure. When determining an intersection, time 908 may be taken into account, particularly as renewable power 906 and agricultural fuel 904 varies over time (due to various factors). The fourth dimension of time 908 may be represented by a color or weight of the points or lines 910 in the chart (in this example, the diameter or weight of the lines 910 may represent time).

Figure 10:
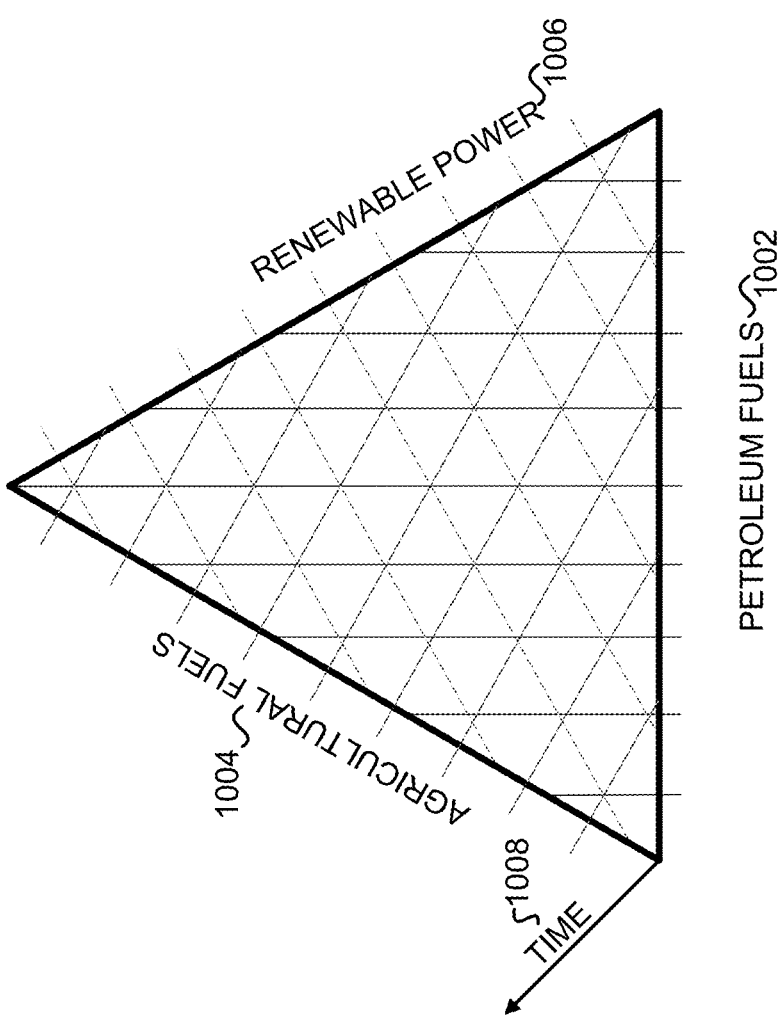
Figure 11A:
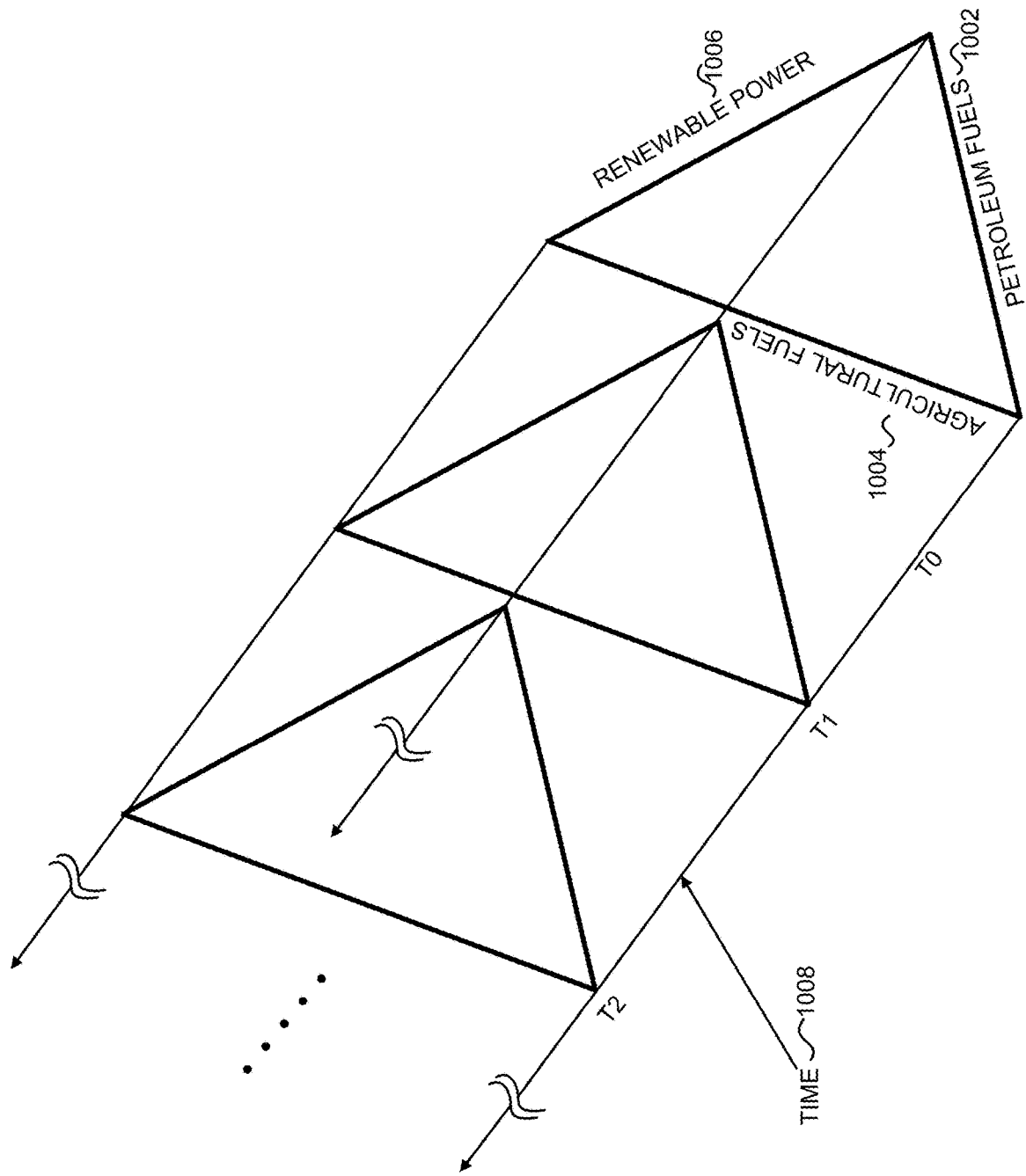
Figure 11B:
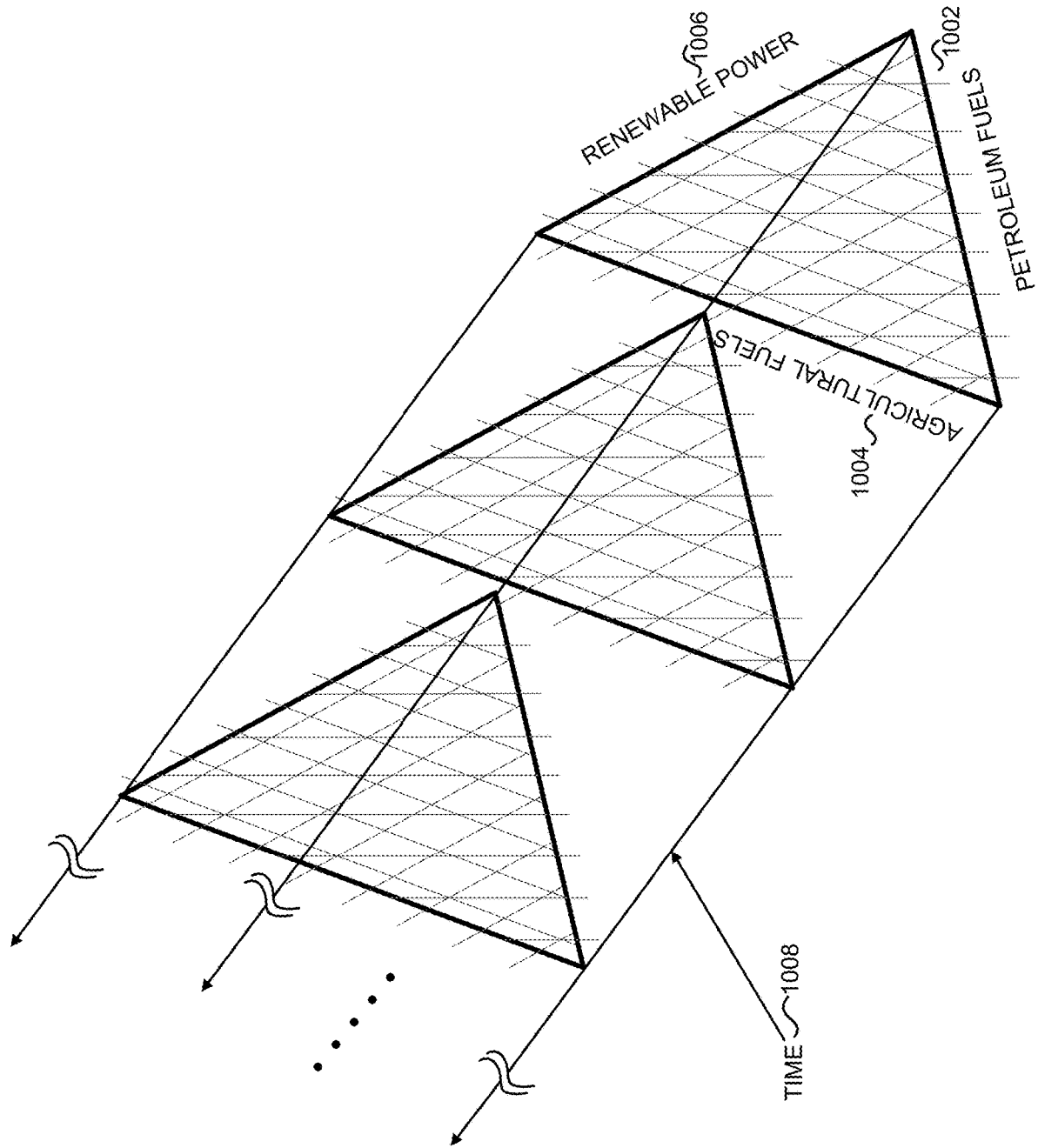
Figure 11C:
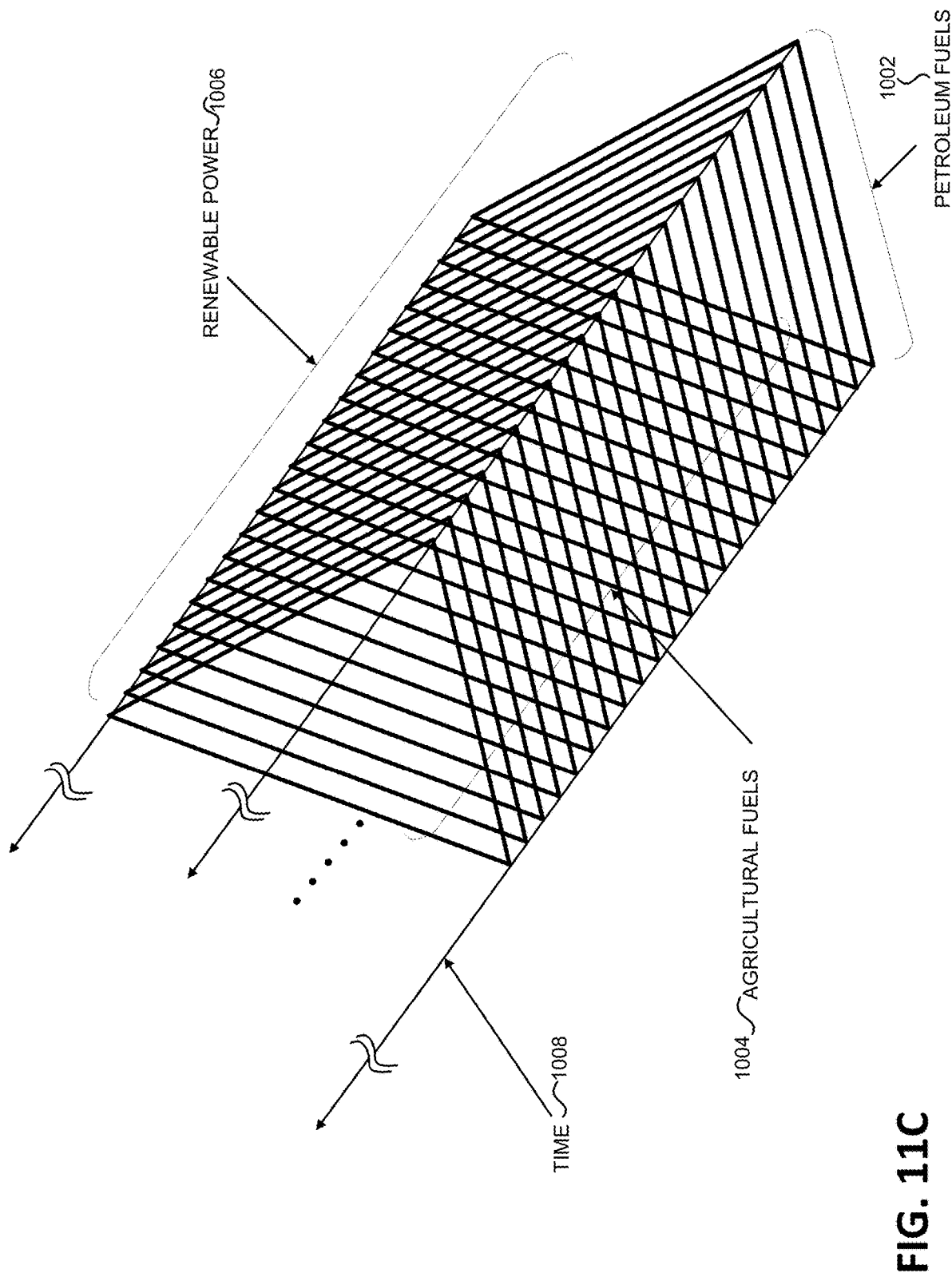
Figure 12:
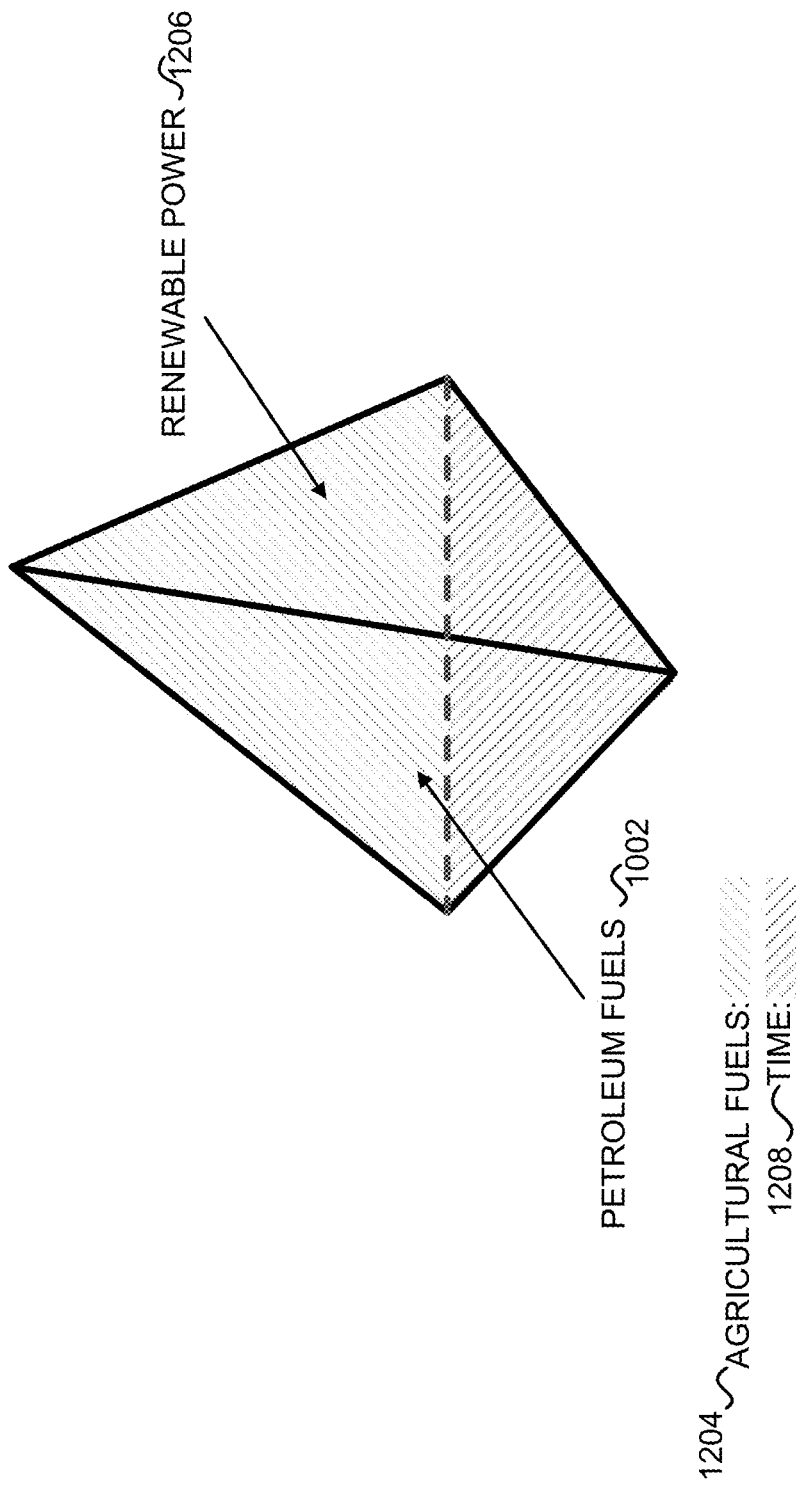

FIGS. 10 through 12 are simplified graphs illustrating integration opportunities of various low carbon intensity applications over time, according to one or embodiments of the disclosure. In the ternary graph, the petroleum fuel axis 1002 may represent an amount of petroleum fuel to be utilized (from 0% to 100%) in relation to agricultural fuel for a hydrocarbon product. The agricultural fuel axis 1004 may represent an amount of agricultural fuel to be utilized (from 0% to 100%) in relation to petroleum fuel for a hydrocarbon product. The renewable power axis 1006 may represent an amount or ratio of renewable power used to produce petroleum fuel in relation to traditional fossil fuel based power and to produce agricultural fuel in relation to traditional fossil fuel based power. For example, the amount of power to produce a petroleum fuel and an agricultural may be different. Each portion of that amount may be renewable or fossil fuel based. In an example, the amount of power to produce a petroleum is 60% and an agricultural fuel is 40%. A portion of each may be renewable power. If all of the agricultural fuel production is powered by renewables and none of the petroleum fuel production utilizes renewables, then the point on the ternary graph may reflect that 40% renewable power is utilized. If the agricultural fuel production is powered by 20% renewable power and the petroleum product production is powered by 30% renewable power, then the point on the graph may reflect that 50% renewable power is utilized. Further, the ternary graph may include time 1008 as an axis. As time 1008 moves, factors may change in regards to availability of each other axis. For a particular hydrocarbon product, the mix may change over time 1008. In FIGS. 11A through C, the time 1008 axis is more clearly represented. Time 1008 may be viewed as layers of the ternary graph moving out in the direction of time 1008. Each point may change over time 1008, based on various factors.

Figure 13:
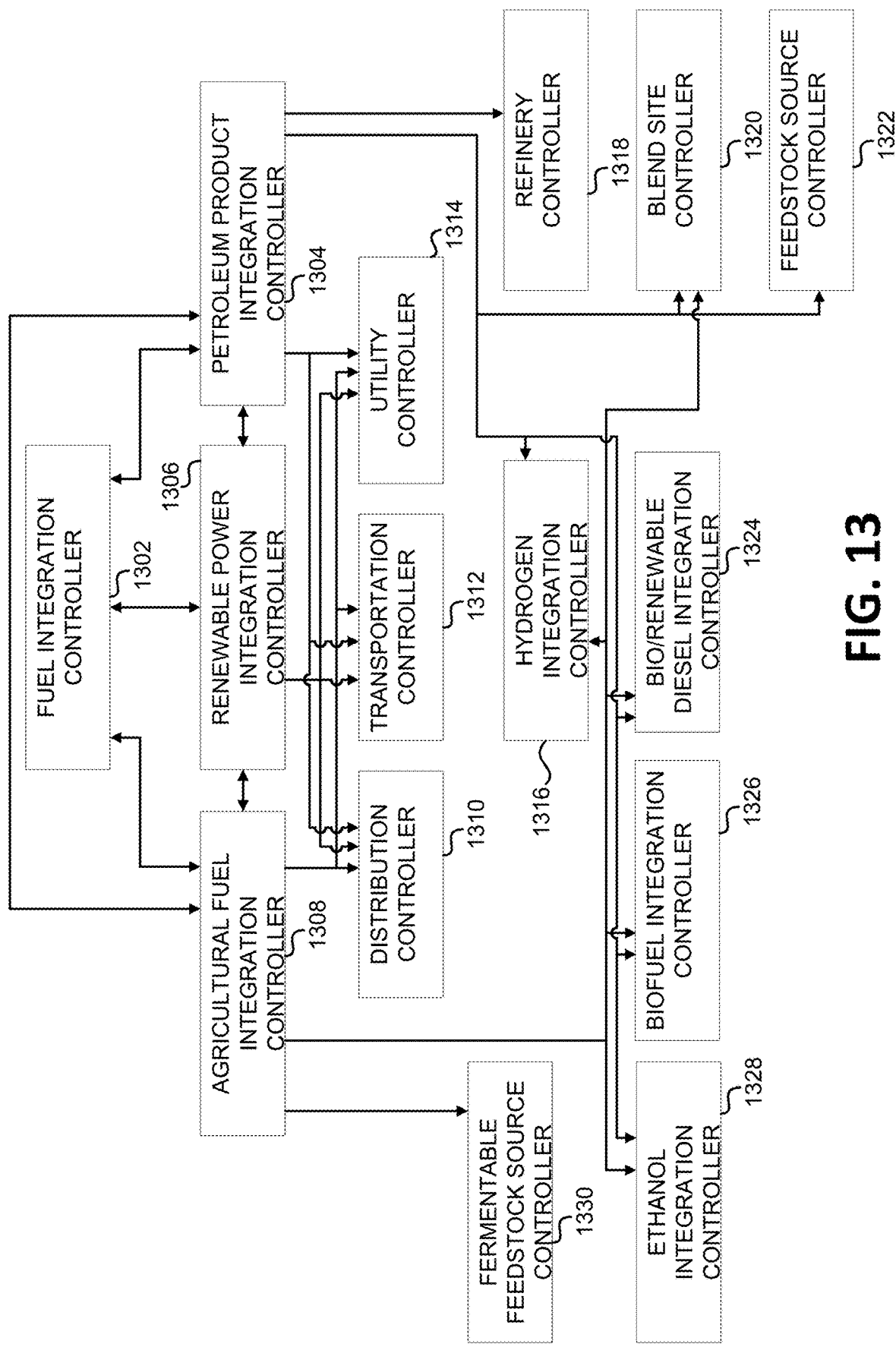
FIG. 13 is a simplified diagram that illustrates a novel implementation of alternative energy integration strategy in which, based on feedback from various controllers, alternative energy is introduced into hydrocarbon products, according to one or more embodiments of the disclosure.

FIG. 13 is a simplified diagram that illustrates a novel implementation of alternative energy integration strategy in which, based on feedback from various controllers, alternative energy is introduced into hydrocarbon products, according to one or more embodiments of the disclosure. Such a configuration may utilize a fuel integration controller 1302 or hydrocarbon product controller, as described above. The fuel integration controller 1302 may connect to other controllers directly or indirectly. The fuel integration may be in signal communication with and controlling an agricultural fuel integration controller 1308, a renewable power integration controller 1306, and or a petroleum product integration controller 1304. In such examples, the fuel integration controller 1302 may be considered a supervisory controller or a cascade controller. In an example, each controller may be in signal communication with and to control other controllers at varying locations. For example, the agricultural fuel integration controller 1308 may connect to a fermentable feedstock source controller 1330 (e.g., to determine selections and CI of a fermentable feedstock), an ethanol integration controller (e.g., to determine selections and CI of ethanol production), a biofuel integration controller 1326, a bio/renewable diesel integration controller 1324, a hydrogen integration controller 1316, and/or a blend site controller 1320. In another example, the renewable power integration controller 1306 may connect to a utility controller 1314 to determine types of utilities available (particularly renewable). The petroleum product integration controller 1304 may connect to a feedstock source controller 1322

(e.g., to determine selections and CI of a feedstock), a refinery controller 1318 (e.g., to determine selections and CI of hydrocarbon production), a biofuel integration controller 1326, a bio/renewable diesel integration controller 1324, a hydrogen integration controller 1316, and/or a blend site controller 1320.

This application claims priority to, and the benefit of, U.S. Provisional Application No. 63/199,001, filed Nov. 30, 2020, titled "SYSTEMS AND METHODS OF ALTERNATIVE ENERGY INTEGRATION WITH HYDROCARBON PRODUCTS," the disclosure of which is incorporated herein by reference in its entirety. This application is also a continuation-in-part of U.S. Non-Provisional application Ser. No. 17/392,600, filed Aug. 3, 2021, titled "SYSTEMS AND METHODS FOR HOLISTIC LOW CARBON INTENSITY FUEL PRODUCTION," which claims priority to U.S. Provisional Application No. 63/061,162, filed Aug. 4, 2020, titled "SYSTEMS AND METHODS FOR HOLISTIC LOW CARBON INTENSITY FUEL PRODUCTION," U.S. Provisional Application No. 63/066,912, filed Aug. 18, 2020, titled "SYSTEMS AND METHODS FOR HOLISTIC LOW CARBON INTENSITY FUEL PRODUCTION," U.S. Provisional Application No. 63/198,626, filed Oct. 30, 2020, titled "SYSTEMS AND METHODS FOR HOLISTIC LOW CARBON INTENSITY FUEL AND HYDROGEN PRODUCTION," and U.S. Provisional Application No. 63/113,186, filed Nov. 12, 2020, titled "SYSTEMS AND METHODS FOR HOLISTIC LOW CARBON INTENSITY FUEL AND HYDROGEN PRODUCTION," the disclosures of which are incorporated herein by reference in its entirety. This application is also a continuation-in-part of U.S. Non-Provisional application Ser. No. 17/392,567, filed Aug. 3, 2021, titled "SYSTEMS AND METHODS FOR HOLISTIC LOW CARBON INTENSITY FUEL PRODUCTION," which claims priority to U.S. Provisional Application No. 63/061,162, filed Aug. 4, 2020, titled "SYSTEMS AND METHODS FOR HOLISTIC LOW CARBON INTENSITY FUEL PRODUCTION," U.S. Provisional Application No. 63/066,912, filed Aug. 18, 2020, titled "SYSTEMS AND METHODS FOR HOLISTIC LOW CARBON INTENSITY FUEL PRODUCTION," U.S. Provisional Application No. 63/198,626, filed Oct. 30, 2020, titled "SYSTEMS AND METHODS FOR HOLISTIC LOW CARBON INTENSITY FUEL AND HYDROGEN PRODUCTION," and U.S. Provisional Application No. 63/113,186, filed Nov. 12, 2020, titled "SYSTEMS AND METHODS FOR HOLISTIC LOW CARBON INTENSITY FUEL AND HYDROGEN PRODUCTION," the disclosures of which are incorporated herein by reference in its entirety. This application is also a continuation-in-part of U.S. Non-Provisional application Ser. No. 17/392,622, filed Aug. 3, 2021, titled "SYSTEMS AND METHODS FOR HOLISTIC LOW CARBON INTENSITY FUEL AND ETHANOL PRODUCTION," which claims priority to U.S. Provisional Application No. 63/061,162, filed Aug. 4, 2020, titled "SYSTEMS AND METHODS FOR HOLISTIC LOW CARBON INTENSITY FUEL PRODUCTION," U.S. Provisional Application No. 63/066,912, filed Aug. 18, 2020, titled "SYSTEMS AND METHODS FOR HOLISTIC LOW CARBON INTENSITY FUEL PRODUCTION," U.S. Provisional Application No. 63/198,626, filed Oct. 30, 2020, titled "SYSTEMS AND METHODS FOR HOLISTIC LOW CARBON INTENSITY FUEL AND HYDROGEN PRODUCTION," and U.S. Provisional Application No. 63/113,186, filed Nov. 12, 2020, titled "SYSTEMS AND METHODS FOR HOLISTIC LOW CARBON INTENSITY FUEL AND HYDROGEN PRODUCTION," the disclosures of which are incorporated herein by reference in its entirety. This application is also a continuation-in-part of U.S. Non-Provisional application Ser. No. 17/392,588, filed Aug. 3, 2021, titled "SYSTEMS AND METHODS FOR HOLISTIC LOW CARBON INTENSITY FUEL PRODUCTION," which claims priority to U.S. Provisional Application No. 63/061,162, filed, Aug. 4, 2020, titled "SYSTEMS AND METHODS FOR HOLISTIC LOW CARBON INTENSITY FUEL PRODUCTION," U.S. Provisional Application No. 63/066,912, filed Aug. 18, 2020, titled "SYSTEMS AND METHODS FOR HOLISTIC LOW CARBON INTENSITY FUEL PRODUCTION," U.S. Provisional Application No. 63/198,626, filed Oct. 30, 2020, titled "SYSTEMS AND METHODS FOR HOLISTIC LOW CARBON INTENSITY FUEL AND HYDROGEN PRODUCTION," and U.S. Provisional Application No. 63/113,186, filed Nov. 12, 2020, titled "SYSTEMS AND METHODS FOR HOLISTIC LOW CARBON INTENSITY FUEL AND HYDROGEN PRODUCTION," the disclosures of which are incorporated herein by reference in its entirety.

In the drawings and specification, several embodiments of systems and methods to integrate alternative energy with hydrocarbon products have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. An alternative energy and hydrocarbon product integration and production system to efficiently integrate alternative energy with a hydrocarbon production process to produce a hydrocarbon product for distribution, the system comprising:

an agricultural integration controller in signal communication with and to control one or more agricultural fuel production processes and options associated with the one or more agricultural fuel production processes, the agricultural fuel production processes and options to be operated at and associated with one or more agricultural fuel sites;

a petroleum production integration controller to in signal communication with and to control one or more petroleum product production processes and options associated with the one or more petroleum product production processes, the petroleum product production processes and options to be operated at and associated with one or more petroleum production sites;

a renewable power integration controller in signal communication with and to control one or more renewable power utilities for use in the one or more agricultural fuel production processes and the one or more petroleum product production processes; and a hydrocarbon product controller in signal communication with the agricultural integration controller, the petroleum production integration controller, and renewable power integration controller, the hydrocarbon product controller including one or more processors and memory storing instructions, the instructions, when executed by the one or more processors, to:

for a hydrocarbon product operation occurring at a first time interval:

determine, via the agricultural integration controller, one or more agricultural fuels and a carbon intensity and efficiency associated with each of the one or more agricultural fuels, and an availability of the one or more agricultural fuels based on whether the one or more agricultural fuels are available during the first time interval, determine, via the renewable power integration controller, one or more renewable power utilities and a carbon intensity and efficiency associated with each of the one or more available renewable power utilities, and an availability of the one or more renewable power utilities based on whether the one or more renewable power utilities are available during the first time interval, determine, via the petroleum product integration controller, one or more petroleum product production options and a carbon intensity and efficiency associated with each of the one or more available petroleum product production options, and an availability of the one or more petroleum product production options based on whether the one or more petroleum product production options are available during the first time interval, select two or more of the one or more agricultural fuels, one or more renewable power utilities, and one or more petroleum product production options, based on one or more of a total carbon intensity of the selections, total efficiency associated with each of the selections, or availability of each selection during the first time interval, in response to a selection of one or more agricultural fuels and one or more renewable power utilities, initiate the hydrocarbon product operation at a corresponding agricultural fuel site with corresponding agricultural feedstock, the operation to utilize the selected one or more renewable power utilities, the agricultural fuel site to thereby convert, while utilizing one or more of the selected one or more renewable power utilities, the corresponding agricultural feedstock to a low carbon intensity hydrocarbon product, in response to a selection of one or more petroleum product production options and one or more renewable power utilities, initiate the hydrocarbon product operation at a corresponding petroleum product site with corresponding feedstock, the operation to utilize one or more of the selected one or more renewable power utilities, the corresponding petroleum product site to thereby convert, while utilizing one or more of the selected one or more renewable power utilities, the corresponding feedstock to a low carbon intensity hydrocarbon product, in response to a selection of one or more petroleum product production options and one or more agricultural fuels, initiate the hydrocarbon product operation at a corresponding blending site with the one or more petroleum products and the one or more agricultural fuels, the corresponding blending site to combine the one or more petroleum products and the one or more agricultural fuels thereby forming a low carbon intensity hydrocarbon product, and in response to a selection of one or more petroleum product production options, one or more agricultural fuels, and one or more renewable power utilities, initiate the hydrocarbon product operation at a corresponding blending site with the one or more petroleum products and the one or more agricultural fuels, the operation to utilize one or more of the selected one or more renewable power utilities, the corresponding blending site to combine the one or more petroleum products and the one or more agricultural fuels, while utilizing the one or more of the selected one or more renewable power utilities, thereby forming a low carbon intensity hydrocarbon product.

2. The system of claim 1, wherein the hydrocarbon product operation is a continuous operation.

3. The system of claim 1, wherein the hydrocarbon product operation is a batch operation.

4. The system of claim 1, wherein the hydrocarbon product controller is a supervisory controller.

5. A method to efficiently integrate alternative energy with a hydrocarbon product, the method comprising:

determining a first intersection of renewable power utilities and petroleum product production at a refinery for a hydrocarbon product production, based on a petroleum product production time interval and renewable power utility availability;

determining a second intersection of agricultural fuel production at an agricultural fuel site and petroleum product production at the refinery for the hydrocarbon product production, based on the petroleum product production time interval, an agricultural fuel production time interval, and available stored agricultural fuel;

determining a third intersection of agricultural fuel production at the agricultural fuel site and renewable power utilities for the hydrocarbon product production, based on the agricultural fuel production time interval and renewable power availability;

determining efficiency of a fourth intersection of agricultural fuel production at the agricultural fuel site, renewable power utilities for the hydrocarbon product production, and petroleum product production at the refinery, based on the petroleum product production time interval, renewable power utility availability, an agricultural fuel production time interval, and available stored agricultural fuel, in response to a determination that the efficiency of the fourth intersection is greater than or equal to a threshold efficiency, selecting options associated with the fourth intersection;

in response to a determination that the efficiency of the fourth intersection is less than the threshold efficiency, selecting options associated with one or more of the first intersection, second intersection, and third intersection;

in response to a selection including agricultural fuel production, initiating agricultural fuel production at the agricultural fuel site with a specified agricultural feedstock and specified agricultural options thereby converting the agricultural feedstock to an agricultural fuel for use in the hydrocarbon product production;

in response to a selection including petroleum product production, initiating petroleum product production at the refinery with a specified feedstock and specified petroleum product options thereby converting the specified feedstock to a petroleum product for use in the hydrocarbon product production;

in response to a selection including renewable power utilities, utilizing renewable power during specified portions of the hydrocarbon product production, combining any produced and specified petroleum products with any produced and specified agricultural fuel, thereby forming the hydrocarbon product, and maintaining a record that is associated with the selected options and petroleum product production, the record detailing the carbon intensity of each selected option and petroleum products to be provided to an end user.

6. A method to efficiently integrate alternative energy with a hydrocarbon product, the integration associated with various aspects of alternative energy production, procurement, and transportation and various aspects of petroleum product production, procurement, and transportation, the method comprising:

determining availability of renewable power for use at one or more agricultural fuel related sites and one or more petroleum product related sites;

determining availability of agricultural fuel products for use at one or more renewable power related sites and the one or more petroleum product related sites;

selecting one or more of the available renewable power for use at the one or more agricultural fuel related sites, the available renewable power for use at one or more petroleum product related sites, available agricultural fuel products for use at the one or more renewable power related sites, and available agricultural fuel products for use at the one or more petroleum product related sites;

initiating hydrocarbon product production based on the selections and thereby converting specified feedstock at corresponding sites into hydrocarbon products; and maintaining a record of carbon intensity of the hydrocarbon products based on a carbon intensity of the selected available renewable power, a carbon intensity of the selected available agricultural fuel products, and a carbon intensity of selected one or more petroleum products.

7. The method of claim 6, wherein the available renewable power for use at the one or more agricultural fuel related sites is proximate to the agricultural fuel related site.

8. The method of claim 6, wherein the available renewable power for use at the one or more petroleum fuel related sites is proximate to the petroleum product related sites.

9. A fuel integration controller to operate one or more agricultural fuel related sites and petroleum fuel related sites for distribution of a low carbon intensity (CI) transportation fuel obtained through one or more targeted reductions of carbon emissions (CE) associated with various available renewable power sources, available agricultural fuel, and available petroleum fuel related CI improvements, the controller comprising:

a first input/output in signal communication with an agricultural fuel controller, the agricultural fuel controller to control various aspects of agricultural fuel production, such that the controller is configured to:
determine one or more available agricultural fuels from one or more agricultural fuel sources at a first time interval,
determine carbon intensity of the one or more available agricultural fuels at the first time interval based on two or more of:
a type of feedstock utilized to produce the one or more available agricultural fuels,
a type of transportation utilized to transport the type of feedstock to an agricultural fuel facility,
utilities utilized to produce the one or more available agricultural fuels, or
one or more agricultural fuel facility processes utilized to produce the one or more available agricultural fuels, and
initiate production of one or more available agricultural fuels based on carbon intensity and time for completion of the production in relation to the first time interval;

a second input/output in signal communication with a renewable power controller, the renewable power controller to control various aspects of renewable power production, such that the controller is configured to:
determine a second time interval associated with availability of renewable power from one or more renewable power sources, and
determine carbon intensity of the renewable power at the second time interval provided from the one or more renewable power sources based on a distance from the one or more renewable power sources to a destination; and a third input/output in signal communication with a petroleum product controller, the petroleum product controller to control various aspects of transportation fuel production, such that the controller is configured to:
determine a third time interval for transportation fuel production,
in response to a determination that the third time interval is equal to or later than the first time interval, select the one or more available agricultural fuels, based on the carbon intensity of the one or more available agricultural fuels, for the transportation fuel production,
in response to a determination that the third time interval is about equal to the second time interval, select the renewable power for the transportation fuel production,
select options for the transportation fuel production based on carbon intensity and time,
initiate the transportation fuel production utilizing selections at a refinery, thereby refining specified feedstock and other selected fuels into a transportation fuel, and
determine the carbon intensity of the produced transportation fuel.

10. A hydrocarbon product controller to efficiently integrate alternative energy with a hydrocarbon product, the hydrocarbon product controller comprising:

a first input/output in signal communication with an agricultural fuel controller, the agricultural fuel controller to control various aspects of agricultural fuel production, such that the hydrocarbon product controller is configured to:
determine one or more available agricultural fuels from one or more agricultural fuel sources at a first time interval,
determine carbon intensity of the one or more available agricultural fuels at the first time interval based on two or more of:
a type of feedstock utilized to produce the one or more available agricultural fuels,
a type of transportation utilized to transport the type of feedstock to an agricultural fuel facility,
utilities utilized to produce the one or more available agricultural fuels, or
one or more agricultural fuel facility processes utilized to produce the one or more available agricultural fuels, initiate production of one or more available agricultural fuels at an agricultural fuel production site, based on time, efficiency, and available renewable power, and in response to a determination of surplus produced agricultural fuel, initiate a prompt to distribute the surplus produced agricultural fuel to storage, the prompt including an associated carbon intensity of the surplus produced agricultural fuel;

a second input/output in signal communication with a renewable power controller, the renewable power controller to control various aspects of renewable power production, such that the hydrocarbon product controller is configured to:

determine a second time interval associated with availability of renewable power from one or more renewable power sources, and determine carbon intensity of the renewable power at the second time interval provided from the one or more renewable power sources based on a distance from the one or more renewable power sources to a destination; and a third input/output in signal communication with a petroleum product controller, the petroleum product controller to control various aspects of hydrocarbon product production, such that the hydrocarbon product controller is configured to:

determine a third time interval for hydrocarbon product production, in response to a determination that the third time interval is equal to or later than the first time interval, select the one or more available agricultural fuels, based on the carbon intensity of the one or more available agricultural fuels, for the hydrocarbon product production, in response to a determination that an amount of the surplus produced agricultural fuel is available and that one or more available agricultural fuels is not selected, select the amount of the surplus produced agricultural fuel, based on carbon intensity of the amount of the surplus produced agricultural fuel and a carbon intensity associated with a time period of storing the amount of the surplus produced agricultural fuel, for the hydrocarbon product production, in response to a determination that the third time interval is about equal to the second time interval, select the renewable power, based on the carbon intensity of the one or more available agricultural fuels, for the hydrocarbon product production, select options for the hydrocarbon product production based on carbon intensity and time, initiate the hydrocarbon product production utilizing selections at a refinery, and determine the carbon intensity of the produced hydrocarbon product.

* * * * *